(12) United States Patent
Son et al.

(10) Patent No.: US 12,204,224 B2
(45) Date of Patent: Jan. 21, 2025

(54) OPTICAL PATH CONTROL MEMBER AND DISPLAY DEVICE COMPRISING SAME

(71) Applicant: LG INNOTEK CO., LTD., Seoul (KR)

(72) Inventors: Mun Yeong Son, Seoul (KR); Byung Sook Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 239 days.

(21) Appl. No.: 17/925,273

(22) PCT Filed: Apr. 29, 2021

(86) PCT No.: PCT/KR2021/005410
§ 371 (c)(1),
(2) Date: Nov. 14, 2022

(87) PCT Pub. No.: WO2021/230541
PCT Pub. Date: Nov. 18, 2021

(65) Prior Publication Data
US 2023/0161215 A1 May 25, 2023

(30) Foreign Application Priority Data

May 14, 2020 (KR) .................. 10-2020-0057557
May 29, 2020 (KR) .................. 10-2020-0065096

(51) Int. Cl.
*G02F 1/167* (2019.01)
*G02F 1/13* (2006.01)
*G02F 1/1679* (2019.01)

(52) U.S. Cl.
CPC ............ *G02F 1/167* (2013.01); *G02F 1/1323* (2013.01); *G02F 1/1679* (2019.01)

(58) Field of Classification Search
CPC ...... G02F 1/1323; G02F 1/167; G02F 1/1681; G02F 1/16757; G09G 3/34
See application file for complete search history.

(56) References Cited

U.S. PATENT DOCUMENTS 8,331,016 B2 12/2012 Shitagami et al.
9,874,799 B2 1/2018 Shiota
(Continued)

FOREIGN PATENT DOCUMENTS

JP 2012-2924 A 1/2012
JP 2015-114640 A 6/2015
(Continued)

*Primary Examiner* — Alexander P Gross
(74) *Attorney, Agent, or Firm* — Birch, Stewart, Kolasch & Birch, LLP

(57) ABSTRACT

An optical path control member according to an embodiment comprises: a first substrate; a first electrode arranged on the first substrate; a second substrate arranged on the first substrate; a second electrode arranged under the second substrate; an optical conversion unit arranged between the first electrode and the second electrode; and an adhesive layer between the optical conversion unit and the second electrode, wherein the optical conversion unit comprises a partitioning part and an accommodation part that are alternately arranged, a dispersion liquid for changing the transmittance of light is arranged inside the accommodation part, the dispersion liquid is arranged to be in direct contact with the bottom surface and the inner side surfaces of the accommodation part and the lower surface of the adhesive layer, a first contact angle between the dispersion liquid and the bottom surface and the inner side surfaces of the accommodation part is 20° or lower, a second contact angle between the dispersion liquid and the lower surface of the adhesive layer is 20° or lower, and the difference between the first contact angle and the second contact angle is 1° to 5°.

15 Claims, 17 Drawing Sheets

(56) References Cited

U.S. PATENT DOCUMENTS

| | | | |
|---|---|---|---|
| 9,921,452 B2 | 3/2018 | Nakamura et al. | |
| 2020/0050010 A1* | 2/2020 | Zheng | G02B 26/004 |
| 2020/0166836 A1* | 5/2020 | Saito | G03F 7/0002 |

FOREIGN PATENT DOCUMENTS

| | | | |
|---|---|---|---|
| JP | 2017-49552 A | 3/2017 | |
| KR | 10-2010-0065552 A | 6/2010 | |
| KR | 10-2010-0077094 A | 7/2010 | |
| KR | 10-2013-0047026 A | 5/2013 | |
| KR | 10-2017-0112368 A | 10/2017 | |
| KR | 10-2018-0077784 A | 7/2018 | |
| WO | WO 2015/122083 A1 | 8/2015 | |

* cited by examiner

[Fig. 1]
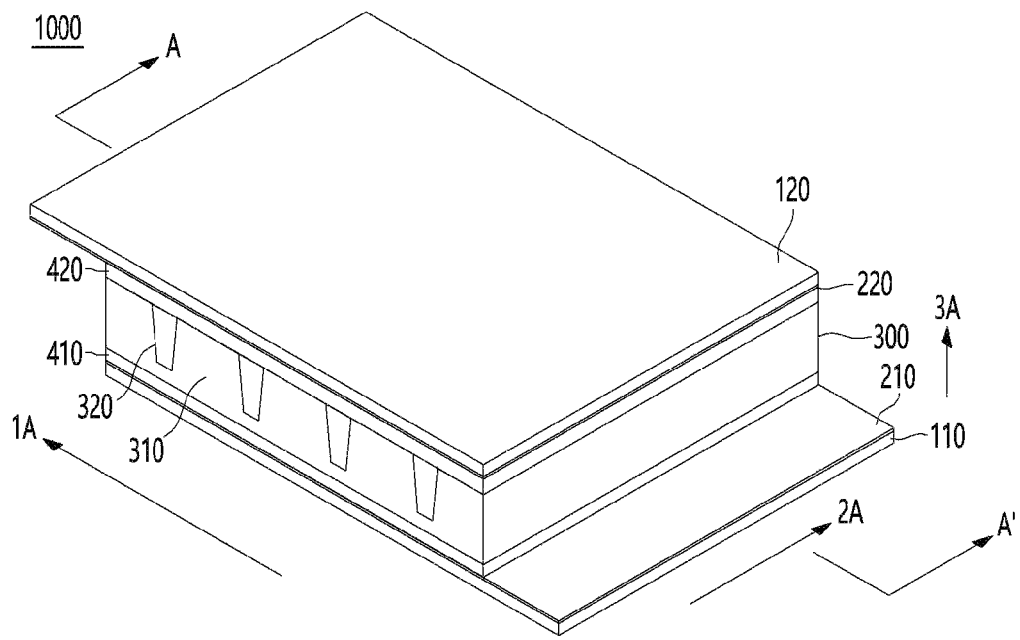
[Fig. 2]
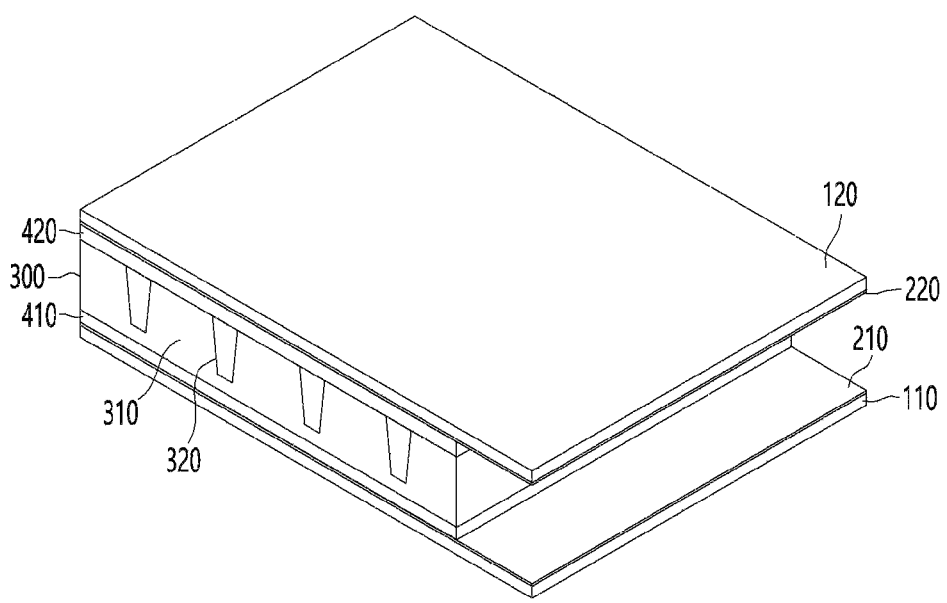

[Fig. 3]
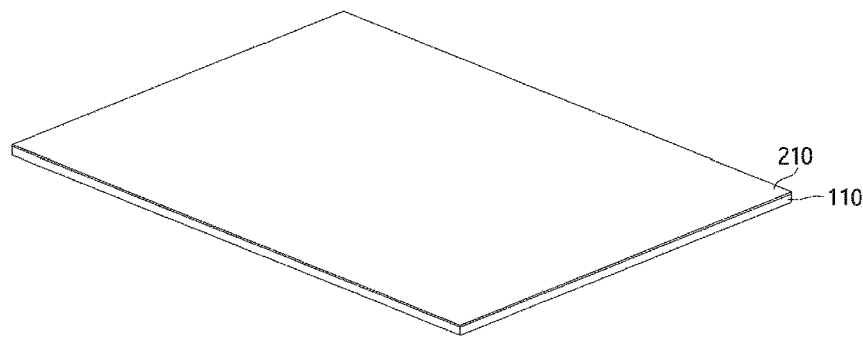
[Fig. 4]
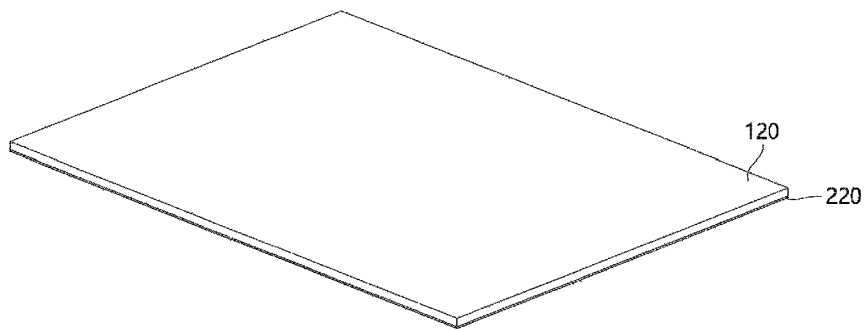
[Fig. 5]
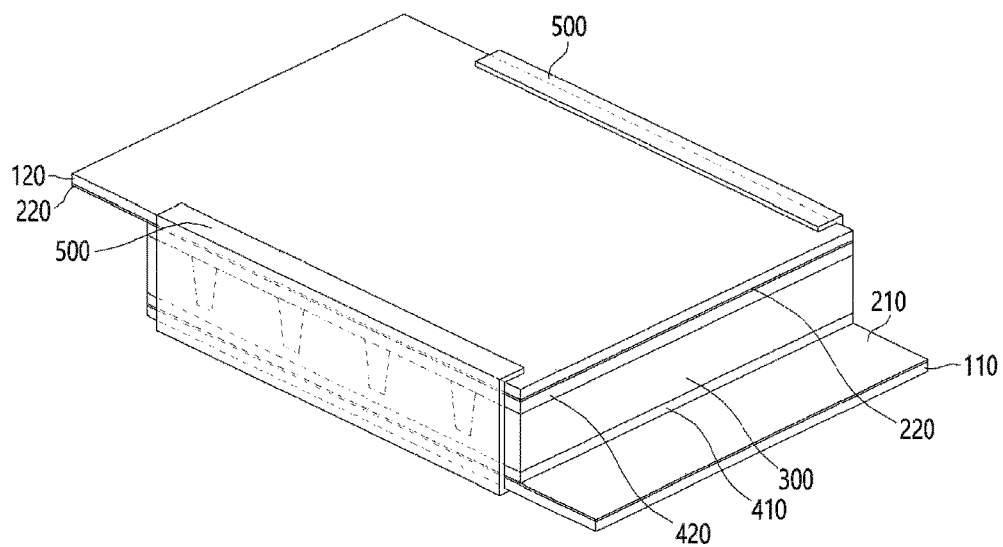

【Fig. 6】
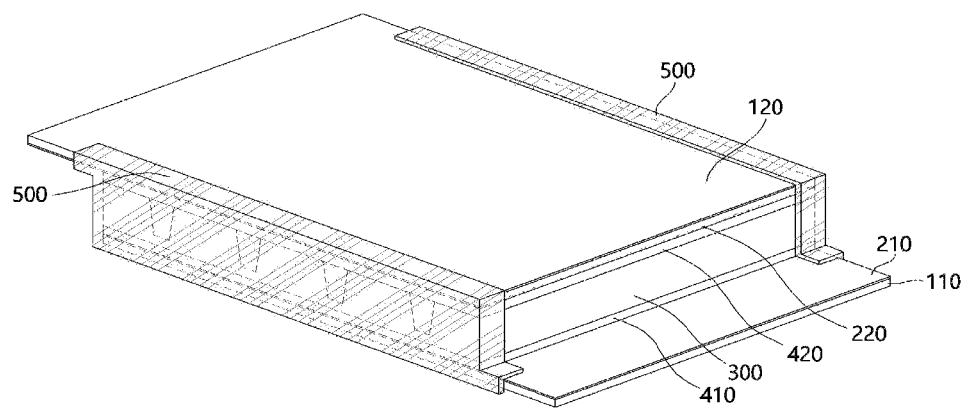
【Fig. 7】
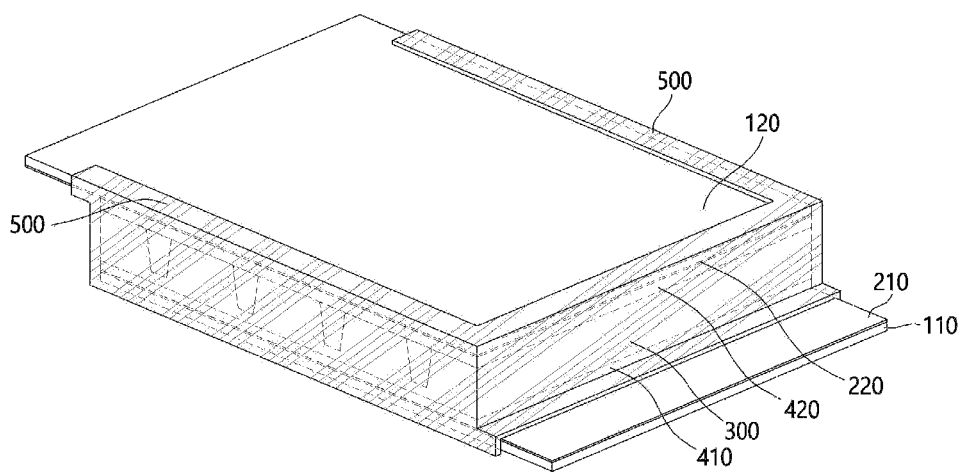

[Fig. 8]
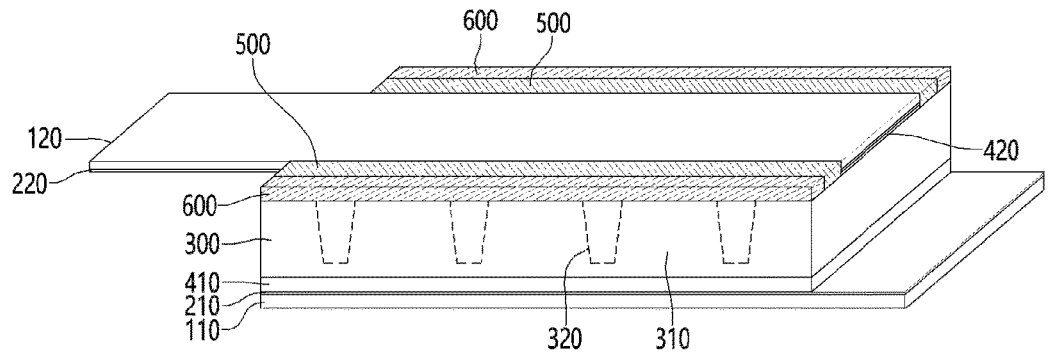
[Fig. 9]
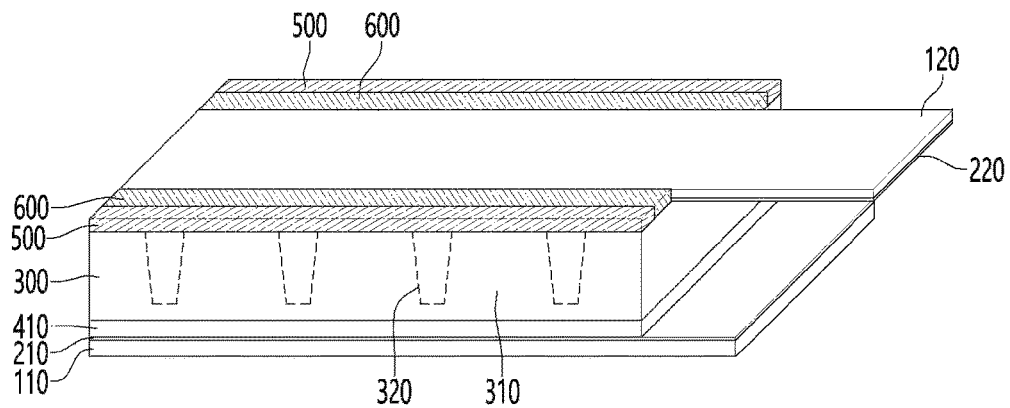
[Fig. 10]
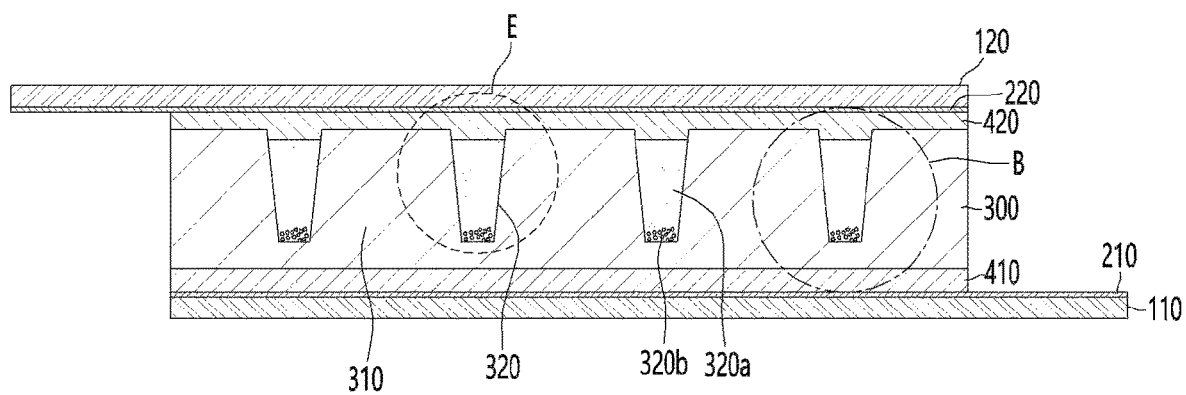

【Fig. 11】
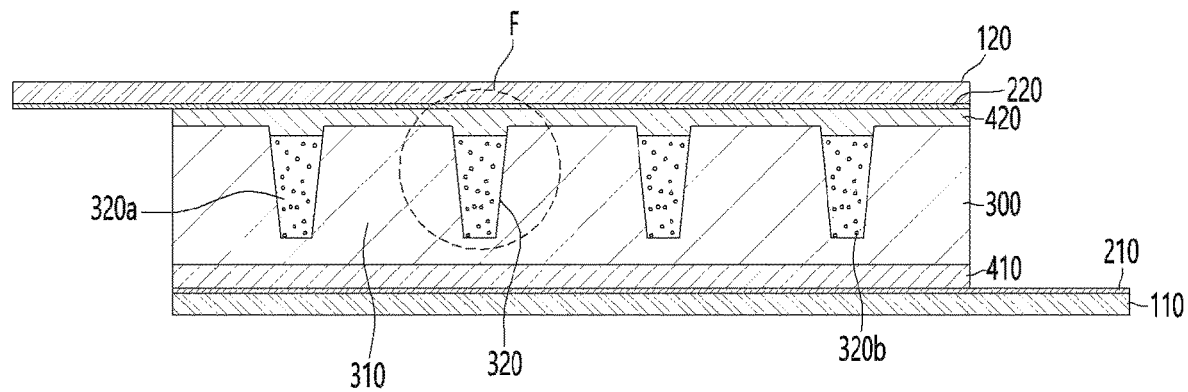
【Fig. 12】
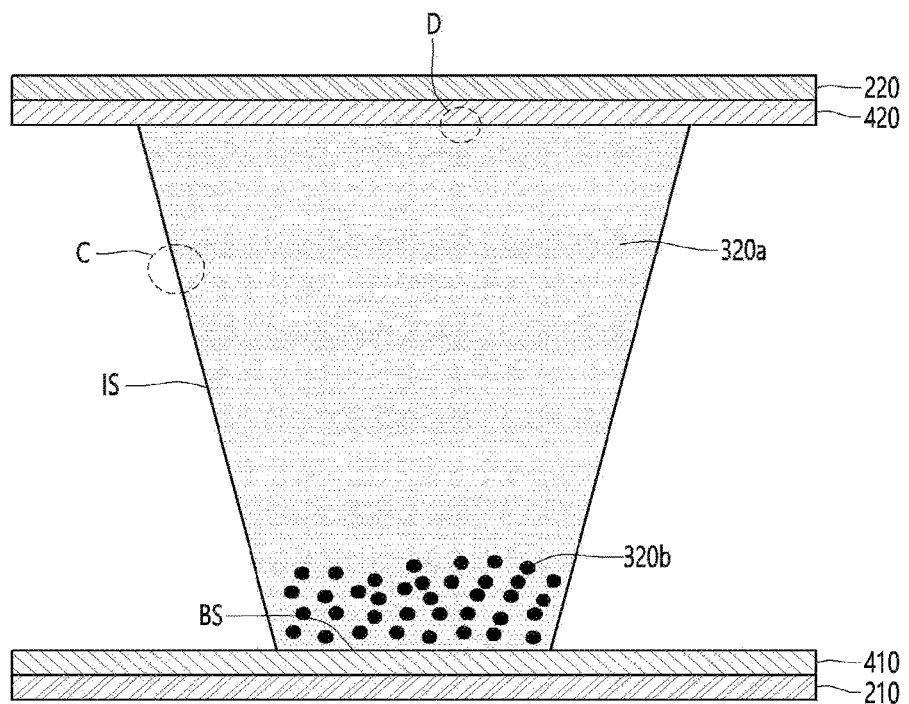

[Fig. 13]
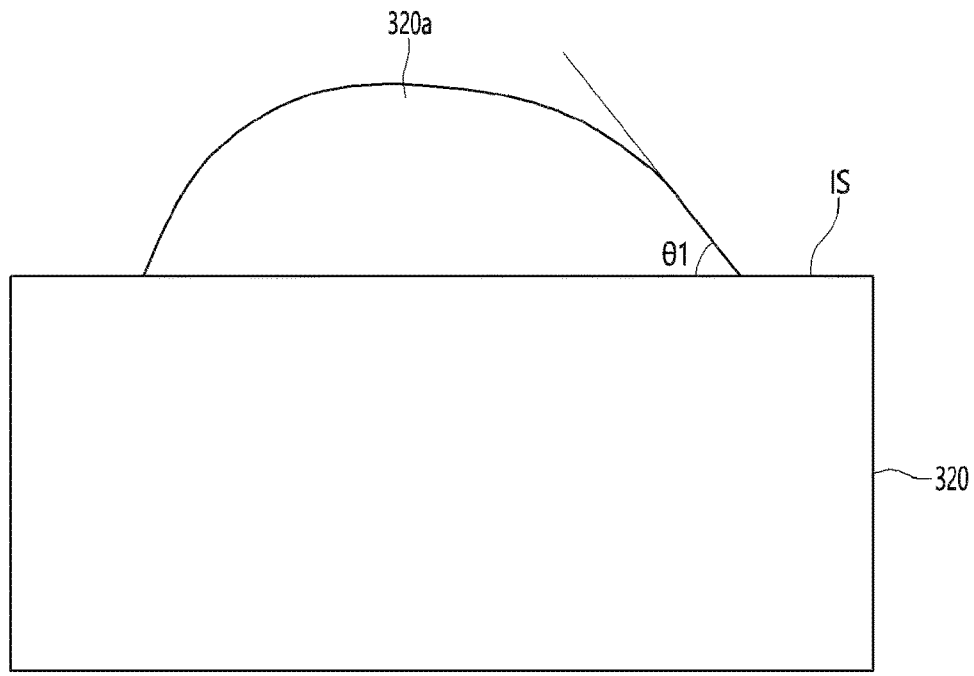
[Fig. 14]
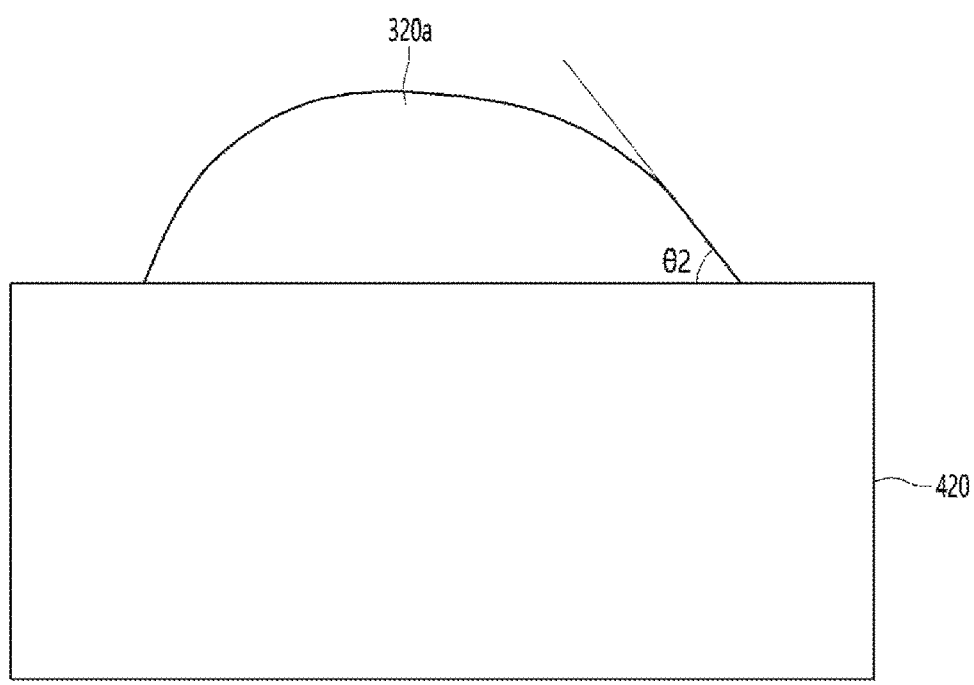

[Fig. 15]
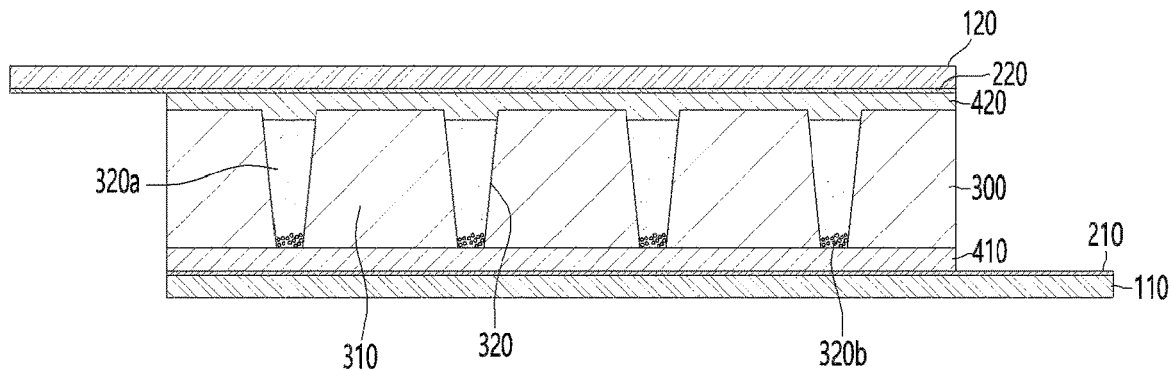
[Fig. 16]
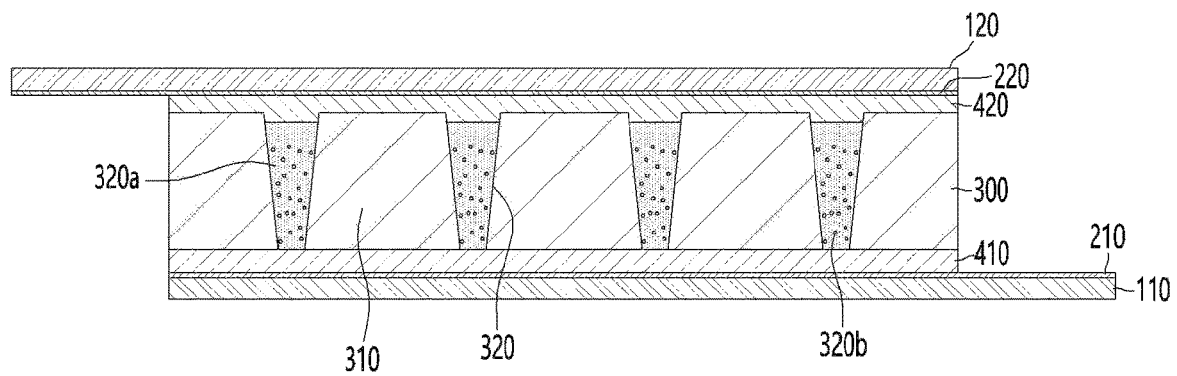
[Fig. 17]
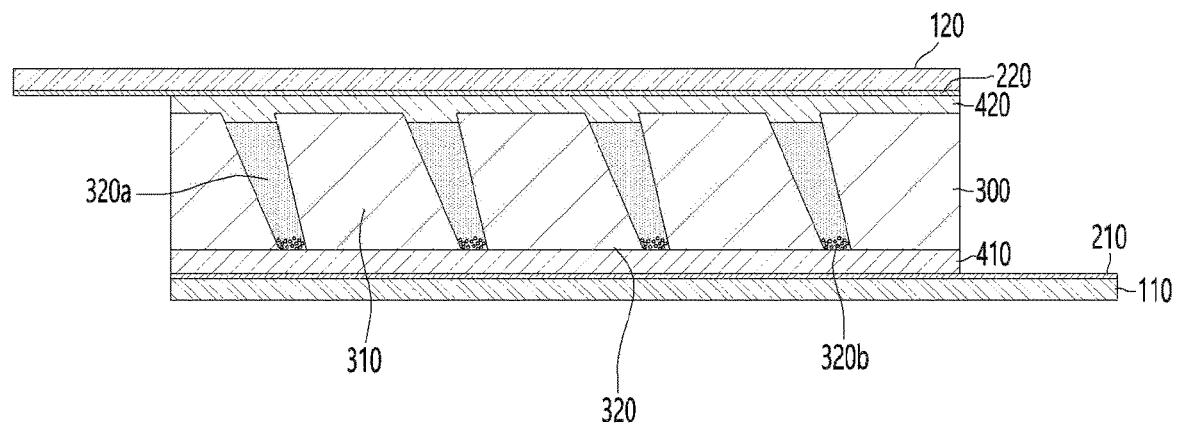

[Fig. 18]
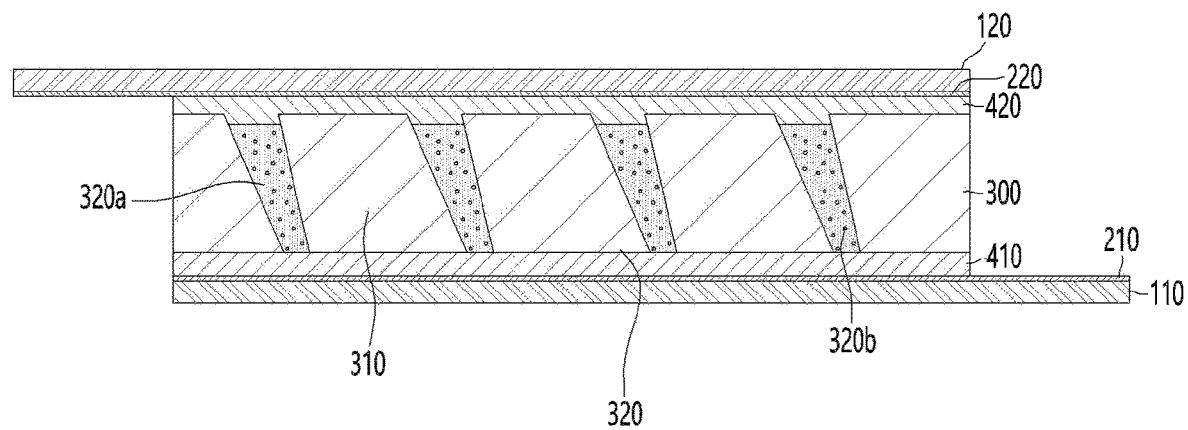
[Fig. 19]
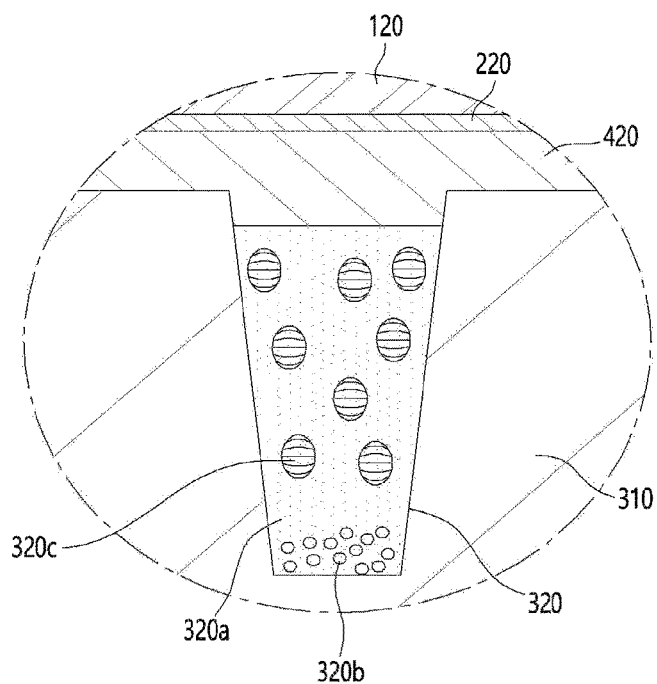

[Fig. 20]
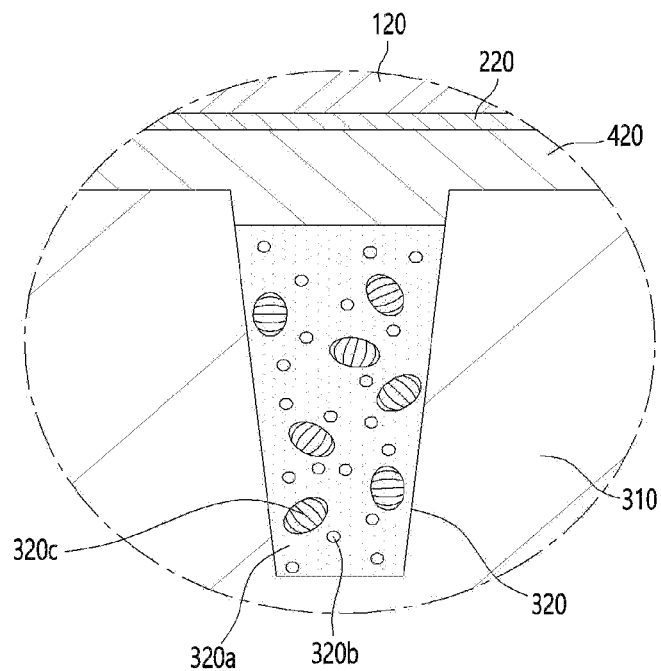
[Fig. 21]
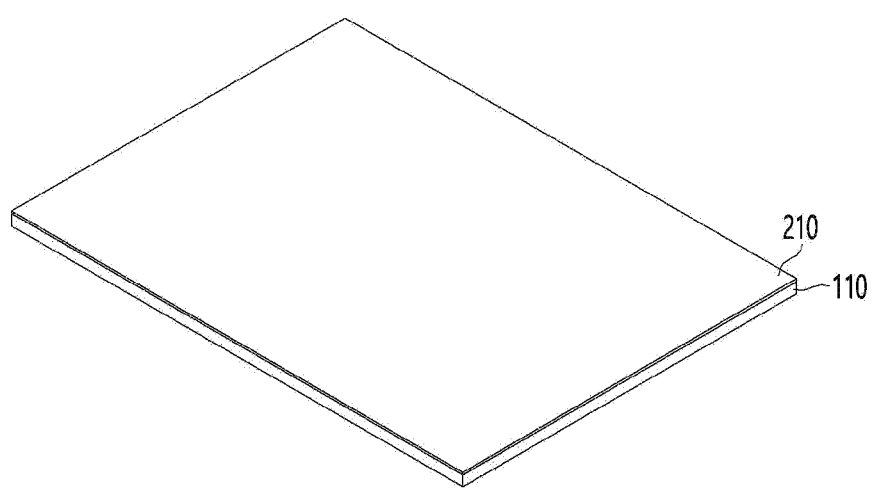

[Fig. 22]
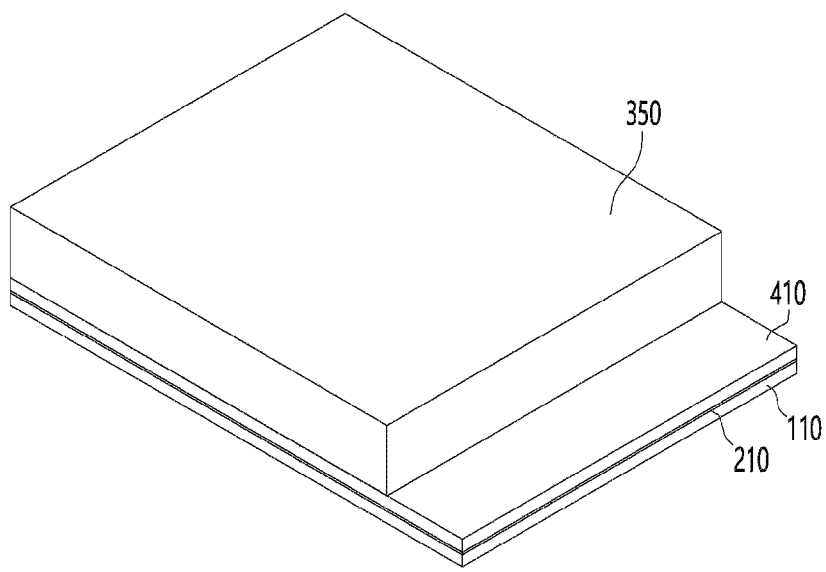
[Fig. 23]
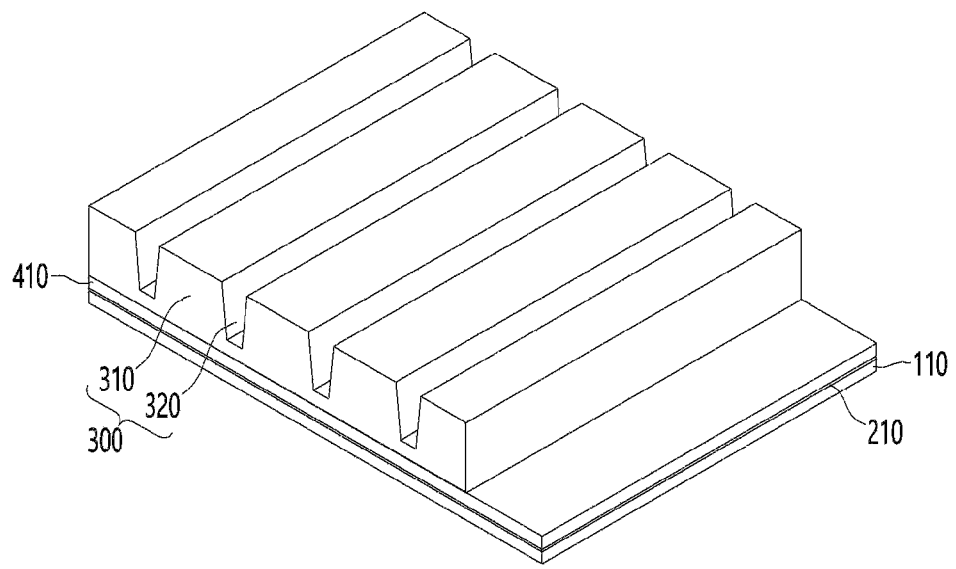

【Fig. 24】
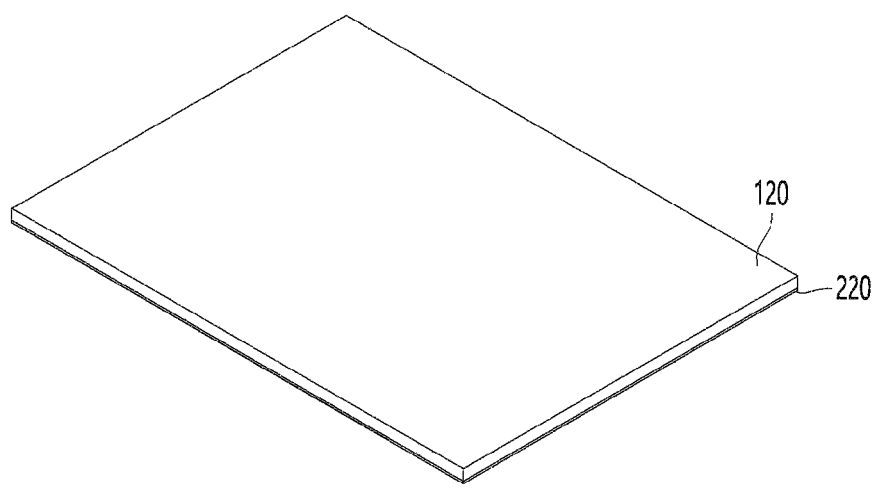
【Fig. 25】
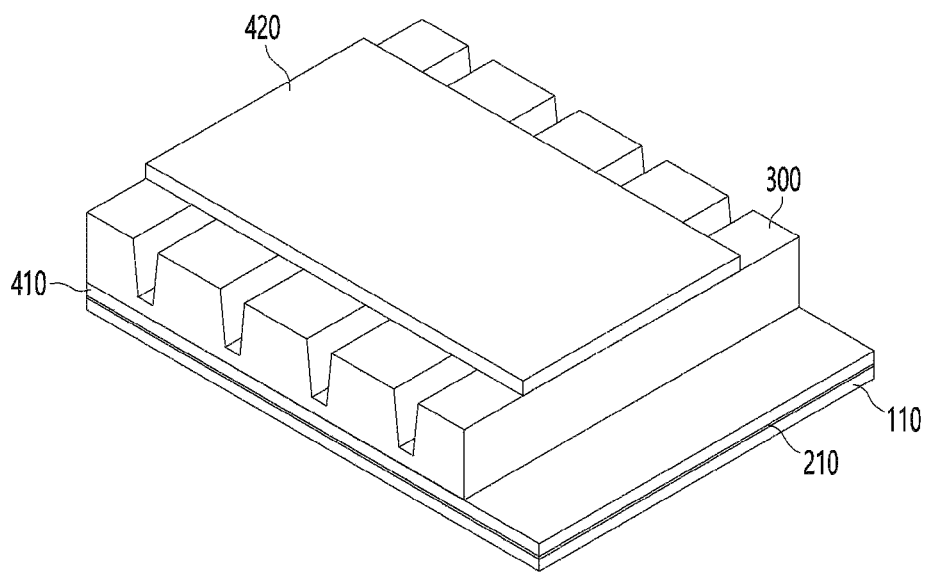

[Fig. 26]
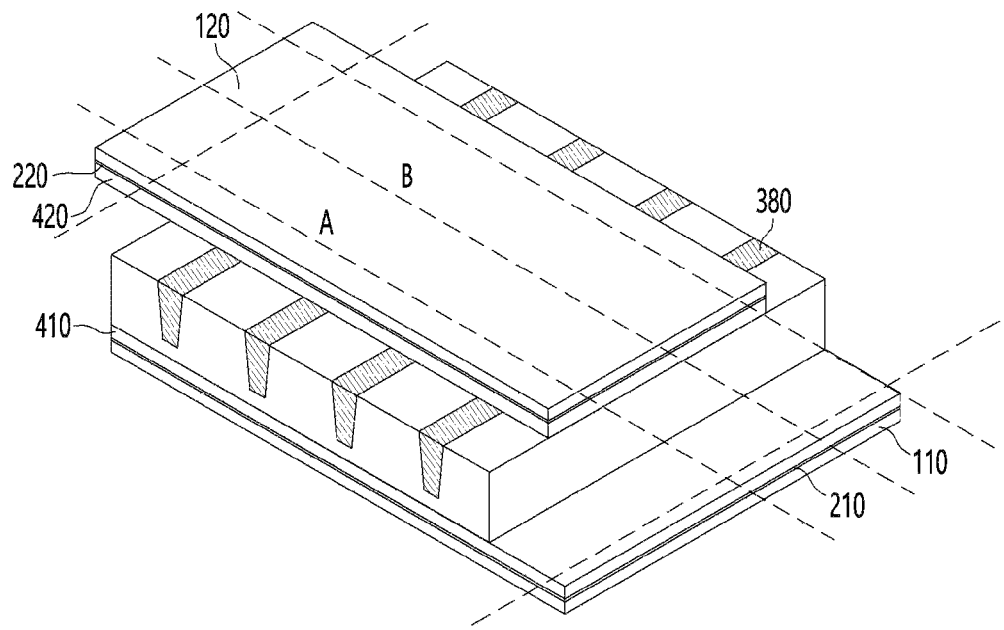
[Fig. 27]
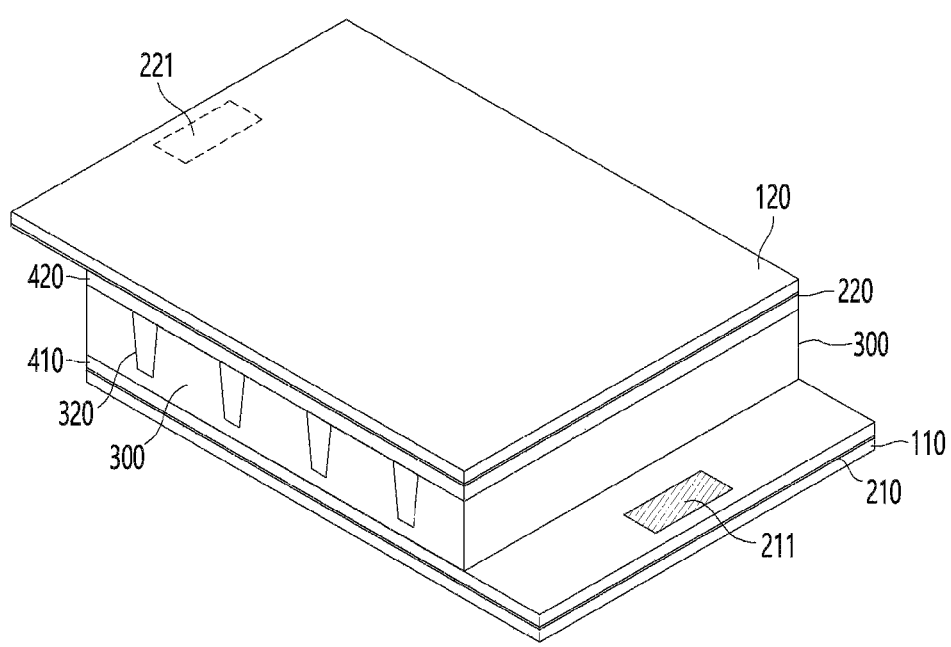

[Fig. 28]
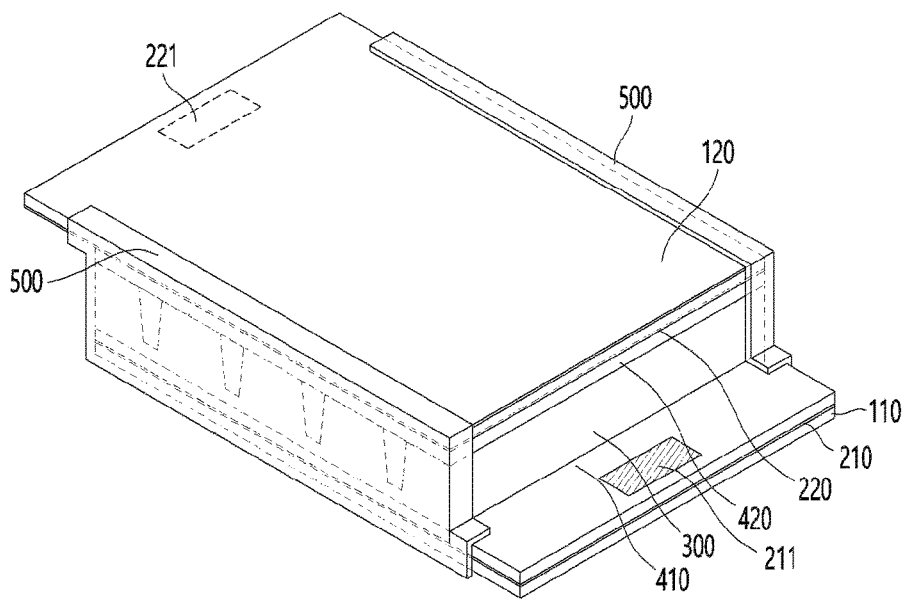
[Fig. 29]
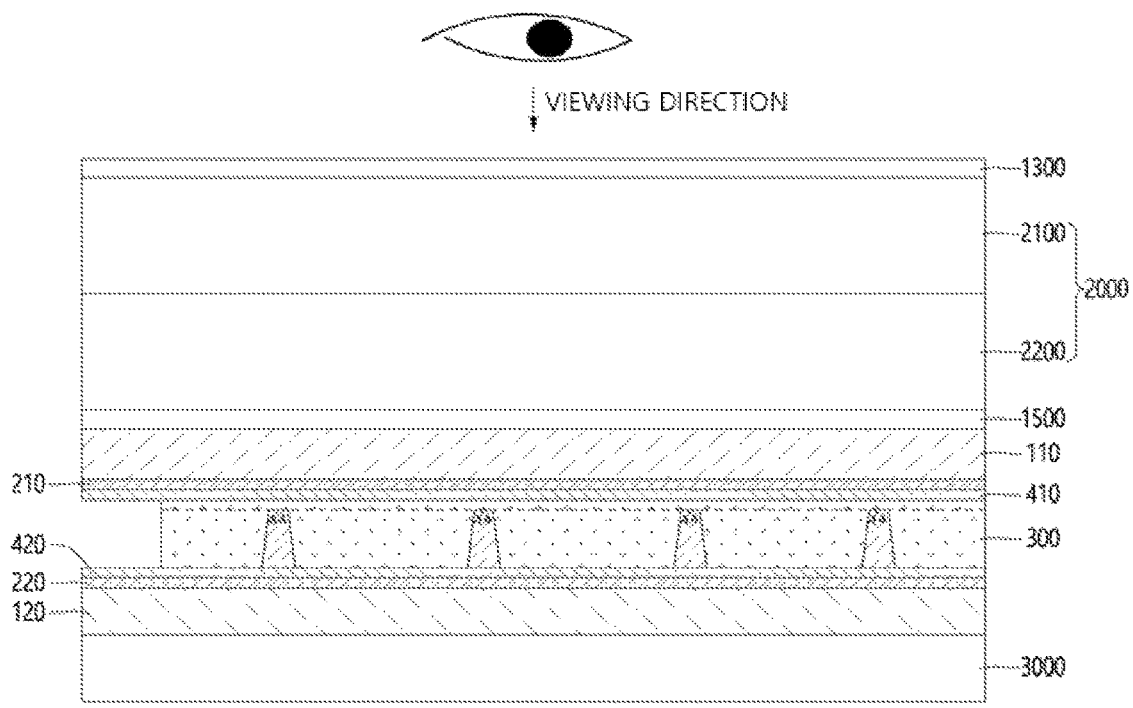

【Fig. 30】
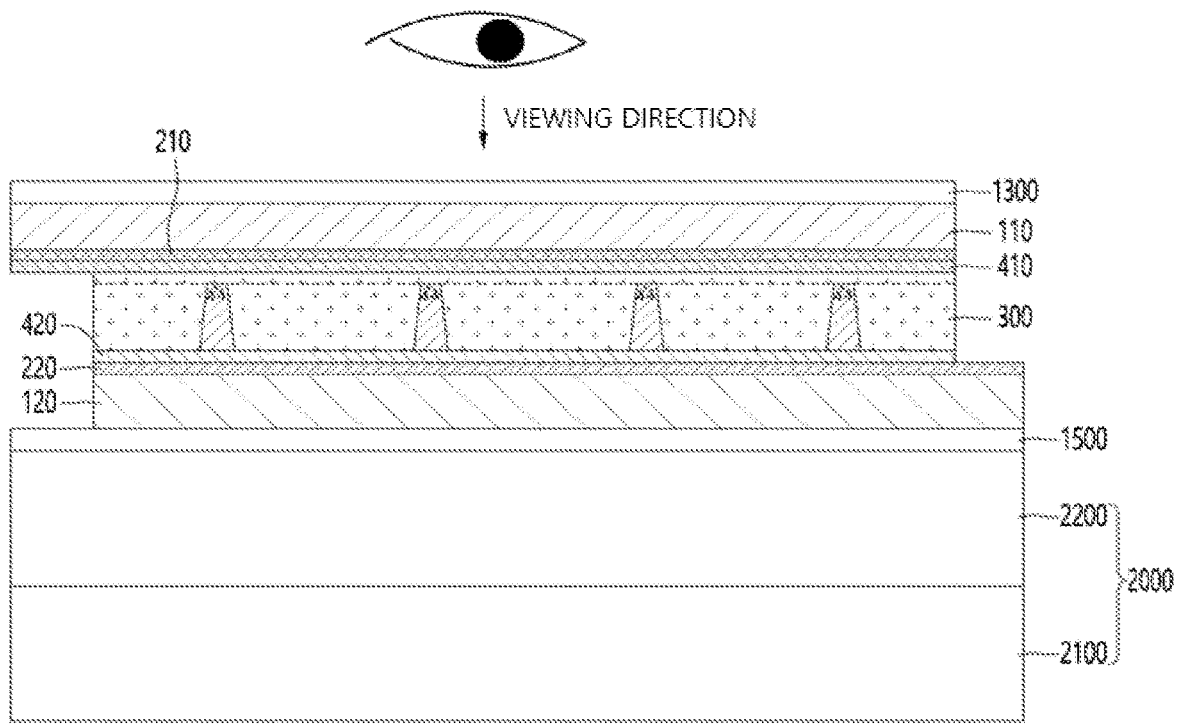

[Fig. 31]
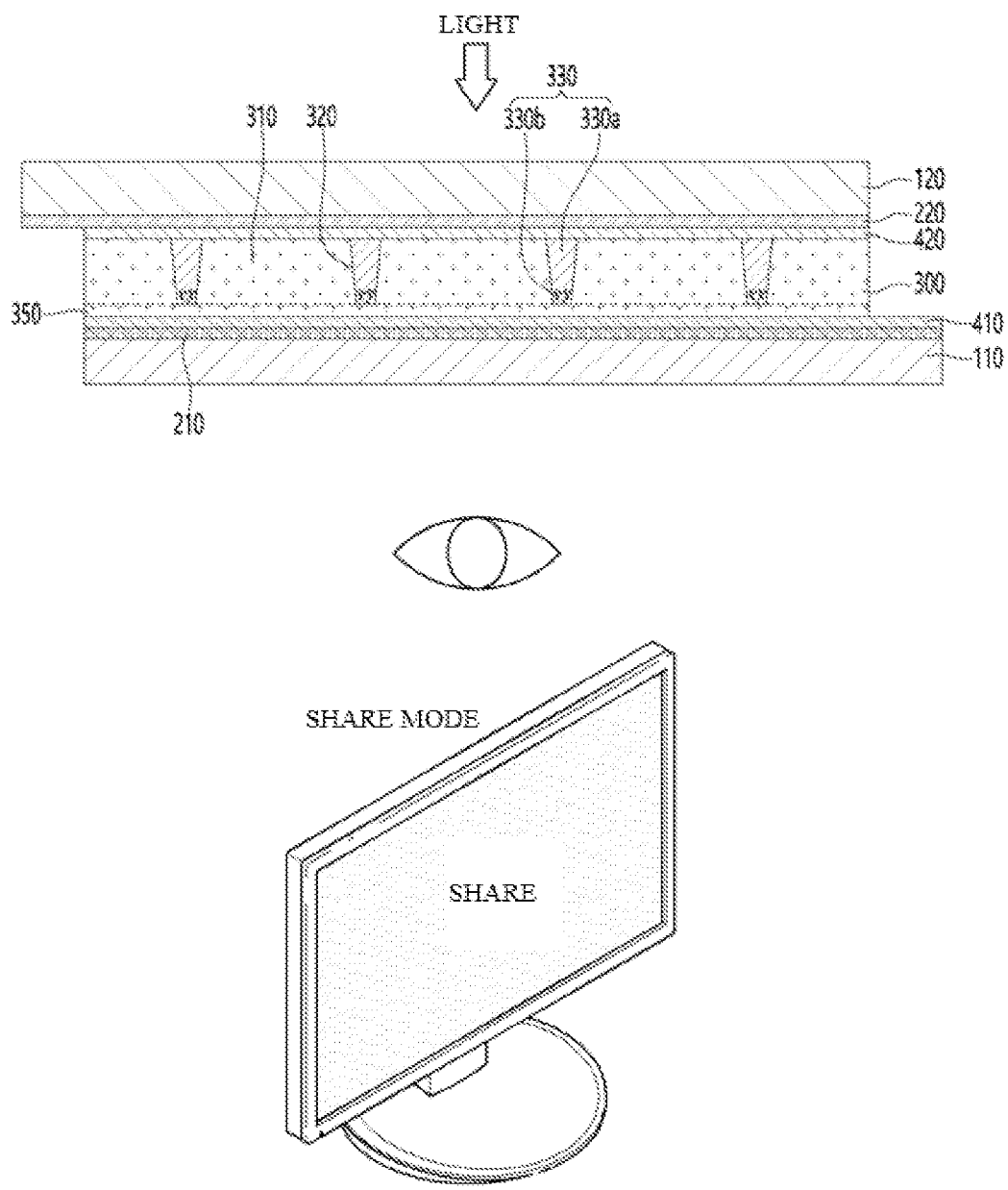

[Fig. 32]
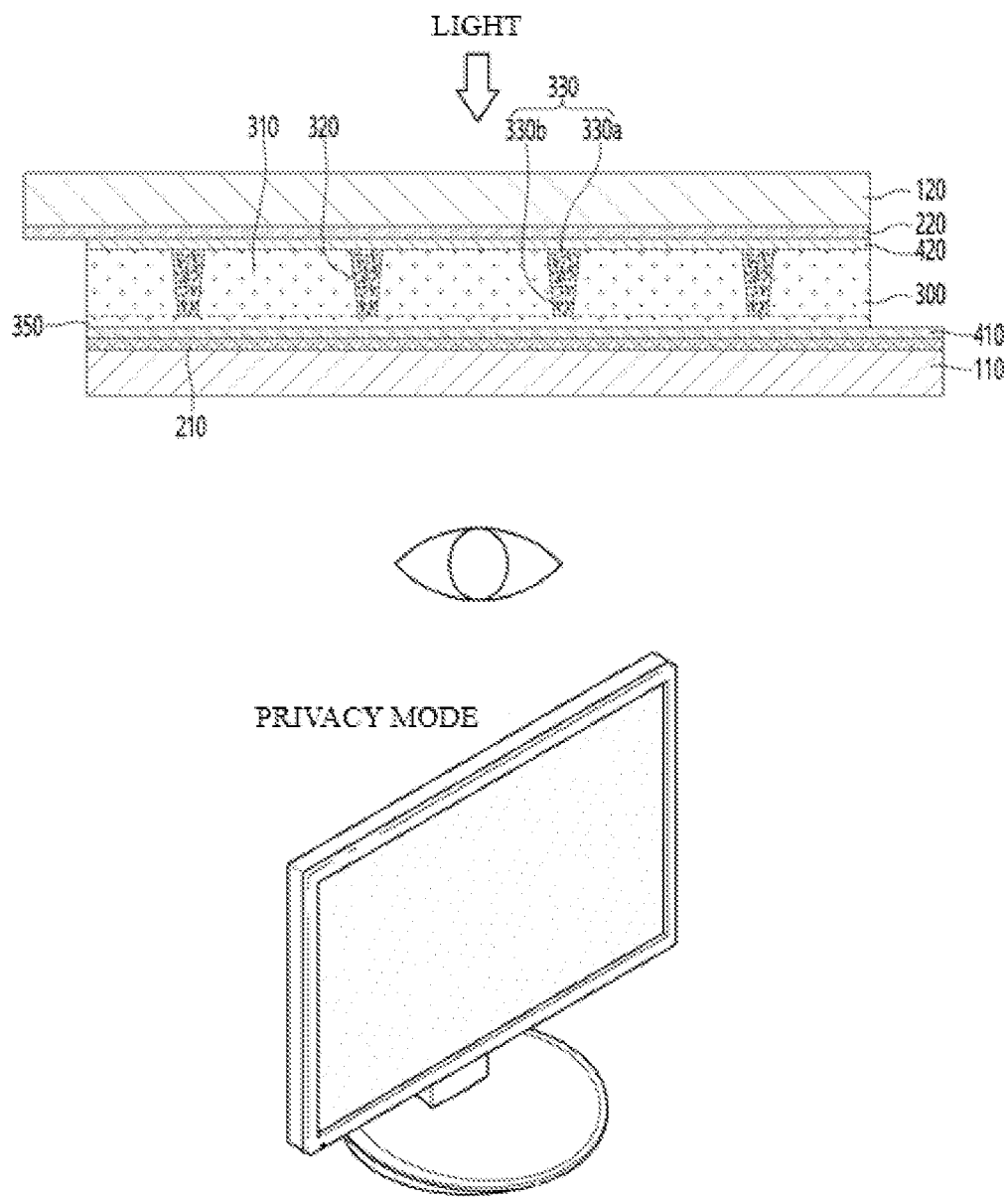

【Fig. 33】
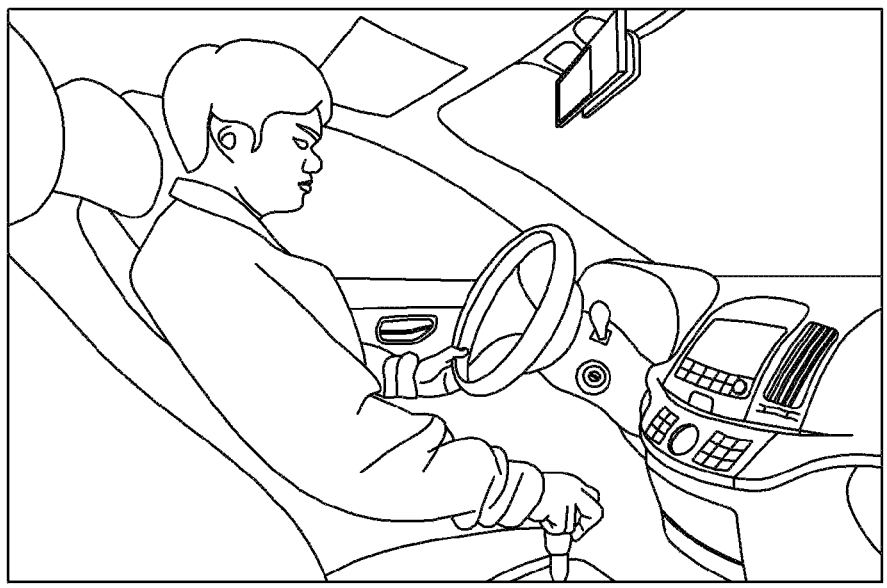

OPTICAL PATH CONTROL MEMBER AND DISPLAY DEVICE COMPRISING SAME

CROSS REFERENCE TO RELATED APPLICATIONS

This application is the National Phase of PCT International Application No. PCT/KR2021/005410, filed on Apr. 29, 2021, which claims priority under 35 U.S.C. 119 (a) to Patent Application No. 10-2020-0057557, filed in the Republic of Korea on May 14, 2020 and to Patent Application No. 10-2020-0065096, filed in the Republic of Korea on May 29, 2020, all of which are hereby expressly incorporated by reference into the present application.

TECHNICAL FIELD

An embodiment relates to an optical path control member, and to a display device including the same.

BACKGROUND ART

A light blocking film blocks transmitting of light from a light source, and is attached to a front surface of a display panel which is a display device used for a mobile phone, a notebook, a tablet PC, a vehicle navigation device, a vehicle touch, etc., so that the light blocking film adjusts a viewing angle of light according to an incident angle of light to express a clear image quality at a viewing angle needed by a user when the display transmits a screen.

In addition, the light blocking film may be used for the window of a vehicle, building or the like to shield outside light partially to prevent glare, or to prevent the inside from being visible from the outside.

That is, the light blocking film may be an optical path control member that controls the movement path of light to block light in a specific direction and transmit light in a specific direction. Accordingly, it is possible to control the viewing angle of the user by controlling a transmission angle of the light by the light blocking film.

Meanwhile, such a light blocking film may be divided into a light blocking film that can always control the viewing angle regardless of the surrounding environment or the user's environment and a switchable light blocking film that allow the user to turn on/off the viewing angle control according to the surrounding environment or the user's environment.

Such a switchable light blocking film may be implemented by switching a pattern part to a light transmitting part and a light blocking part by filling the inside of the pattern part with particles that may move when a voltage is applied and a dispersion liquid for dispersing the particles and by dispersing and aggregating the particles.

The dispersion liquid may be disposed by injecting into an intaglio-shaped pattern portion by a capillary injection method. In case of such a capillary injection method, there are problems that a process takes a long time, and non-uniform filling occurs for each pattern portion.

Therefore, an optical path control member having a new structure capable of solving the above problems is required.

DISCLOSURE

Technical Problem

An embodiment is directed to providing an optical path control member that may be easily manufactured with improved reliability.

Technical Solution

An optical path control member according to an embodiment includes: a first substrate; a first electrode disposed on the first substrate; a second substrate disposed on the first substrate; a second electrode disposed under the second substrate; an optical conversion unit disposed between the first electrode and the second electrode; and an adhesive layer between the optical conversion unit and the second electrode, wherein the optical conversion unit includes a partitioning part and an accommodation part alternately disposed, and a dispersion liquid of which light transmittance changes is disposed inside the accommodation part, the dispersion liquid is disposed in direct contact with a bottom surface, an inner surface of the accommodation part, and a lower surface of the adhesive layer, a first contact angle between the dispersion liquid and the bottom surface and the inner surface of the accommodation part is 20° or less, a second contact angle between the dispersion liquid and the lower surface of the adhesive layer is 20° or less, and a difference between the first contact angle and the second contact angle is 1° to 5°.

Advantageous Effects

An optical path control member according to an embodiment can control a contact angle of a dispersion liquid disposed inside an accommodation part.

In detail, a contact angle between an inner surface and a bottom surface of the accommodation part in contact with the dispersion liquid in the accommodation part and a lower surface of an adhesive layer may be controlled to a size of 20° or less.

Accordingly, the inner surface and the bottom surface of the accommodation part and the lower surface of the adhesive layer having a contact angle of 20° or less may have properties close to hydrophobicity. Therefore, when the dispersion liquid having hydrophobicity is filled inside the accommodation part, the dispersion liquid is filled through contact surfaces having similar properties, so that a filling speed and filling properties of the dispersion liquid can be improved.

In addition, the dispersion liquid may control a difference between a first contact angle with the inner surface and the bottom surface of the accommodation part and a second contact angle with the adhesive layer in a certain size range. Accordingly, a difference between a speed in a region in contact with the accommodation part and a speed in a region in contact with the adhesive layer may be reduced.

Therefore, since the dispersion liquid can be filled in the accommodation part at a uniform speed, the uniformity of filling of the dispersion liquid can be improved.

In addition, the dispersion liquid may have a certain composition, and a solvent of the dispersion liquid may have permittivity in a certain size range. Accordingly, by controlling the composition of the dispersion liquid and the permittivity of the solvent, the first contact angle and the second contact angle may have a size of 20° or less.

That is, in the optical path control member according to the embodiment, it is possible to have improved characteristics and reliability by controlling contact angles of surfaces in contact with the dispersion liquid to improve the filling properties in the accommodation part and to improve the filling uniformity of the plurality of accommodation parts.

DESCRIPTION OF DRAWINGS

FIGS. 1 and 2 are perspective views of an optical path control member according to an embodiment.

FIGS. 3 and 4 are a perspective view of a first substrate and a first electrode and a perspective view of a second substrate and a second electrode of the optical path control member according to the embodiment.

FIGS. 5 to 7 are perspective views for describing that a sealing part is disposed on an optical path control member according to an embodiment.

FIGS. 8 and 9 are perspective views for describing that a sealing part is disposed on an optical path control member according to another embodiment.

FIGS. 10 and 11 are cross-sectional views taken along line A-A' in FIG. 1.

FIG. 12 is an enlarged view of region B in FIG. 10.

FIG. 13 is an enlarged view of region C in FIG. 12.

FIG. 14 is an enlarged view of region D in FIG. 12.

FIGS. 15 to 18 are other cross-sectional views taken along line A-A' in FIG. 1.

FIG. 19 is an enlarged view of region E in FIG. 10.

FIG. 20 is an enlarged view of region F in FIG. 11.

FIGS. 21 to 28 are views for describing a method of manufacturing an optical path control member according to an embodiment.

FIGS. 29 and 30 are cross-sectional views of a display device to which an optical path control member according to an embodiment is applied.

FIGS. 31 to 33 are views for describing one embodiment of the display device to which the optical path control member according to the embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below relates to a switchable optical path control member driven in various modes according to electrophoretic particles moving by applying a voltage.

Referring to FIGS. 1 to 4, an optical path control member 1000 according to an embodiment may include a first substrate 110, a second substrate 120, a first electrode 210, a second electrode 220, and an optical conversion unit 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the optical path control member including the first substrate 110 may also be formed to have flexible, curved, or bent characteristics. Accordingly, the optical path control member according to the embodiment may be changed to various designs.

The first substrate 110 may extend in a first direction 1A, a second direction 2A, and a third direction 3A.

In detail, the first substrate 110 may include the first direction 1A corresponding to a length or width direction of the first substrate 110, a second direction 2A extending in a direction different from the first direction 1A and corresponding to the length or width direction of the first substrate 110, and a third direction 3A extending in a direction different from the first direction 1A and the second direction 2A and corresponding to a thickness direction of the first substrate 110.

For example, the first direction 1A may be defined as the length direction of the first substrate 110, the second direction 2A may be defined as the width direction of the first substrate 110 perpendicular to the first direction 1A, and the third direction 3A may be defined as the thickness direction of the first substrate 110. Alternatively, the first direction 1A may be defined as the width direction of the first substrate 110, the second direction 2A may be defined as the length direction of the first substrate 110 perpendicular to the first direction 1A, and the third direction 3A may be defined as the thickness direction of the first substrate 110.

Hereinafter, for convenience of description, the first direction 1A will be described as the length direction of the first substrate 110, the second direction 2A will be described as the width direction of the first substrate 110, and the third directions 3A will be described as the thickness direction of the first substrate 110.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may include a transparent conductive material. For example, the first electrode 210 may include a conductive material having a light transmittance of about 80% or more. For example, the first electrode 210 may include a metal oxide such as indium tin oxide, indium zinc oxide, copper oxide, tin oxide, zinc oxide, titanium oxide, etc.

The first electrode 210 may have a thickness of 0.05 μm to 2 μm.

Alternatively, the first electrode 210 may include various metals to realize low resistance. For example, the first electrode 210 may include at least one metal of chromium (Cr), nickel (Ni), copper (Cu), aluminum (Al), silver (Ag), molybdenum (Mo). Gold (Au), titanium (Ti), and alloys thereof.

Referring to FIG. 3, the first electrode 210 may be disposed on the entire surface of one surface of the first substrate 110. In detail, the first electrode 210 may be disposed as a surface electrode on one surface of the first substrate 110. However, the embodiment is not limited thereto, and the first electrode 210 may be formed of a plurality of pattern electrodes having a uniform pattern such as a mesh or stripe shape.

For example, the first electrode 210 may include a plurality of conductive patterns. In detail, the first electrode 210 may include a plurality of mesh lines crossing each other and a plurality of mesh openings formed by the mesh lines.

Accordingly, even though the first electrode 210 includes a metal, the first electrode 210 is not visually recognized from the outside, so that visibility may be improved. In addition, the light transmittance is increased by the openings, so that the brightness of the optical path control member according to the embodiment may be improved.

The second substrate 120 may be disposed on the first substrate 110. In detail, the second substrate 120 may be disposed on the first electrode 210 on the first substrate 110.

The second substrate 120 may include a material capable of transmitting light. The second substrate 120 may include a transparent material. The second substrate 120 may include a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS). This is only an example, but the embodiment is not limited thereto.

In addition, the second substrate 120 may be a flexible substrate having flexible characteristics.

Further, the second substrate 120 may be a curved or bended substrate. That is, the optical path control member including the second substrate 120 may also be formed to have flexible, curved, or bent characteristics. Accordingly, the optical path control member according to the embodiment may be changed to various designs.

The second substrate 120 may also extend in the first direction 1A, the second direction 2A, and the third direction 3A in the same manner as the first substrate 110 described above.

In detail, the second substrate 120 may include the first direction 1A corresponding to a length or width direction of the second substrate 120, the second direction 2A extending in a direction different from the first direction 1A and corresponding to the length or width direction of the second substrate 120, and the third direction 3A extending in the direction different from the first direction 1A and the second direction 2A and corresponding to the thickness direction of the second substrate 120.

For example, the first direction 1A may be defined as the length direction of the second substrate 120, the second direction 2A may be defined as the width direction of the second substrate 120 perpendicular to the first direction 1A, and the third direction 3A may be defined as the thickness direction of the second substrate 120.

Alternatively, the first direction 1A may be defined as the width direction of the second substrate 120, the second direction 2A may be defined as the length direction of the second substrate 120 perpendicular to the first direction 1A, and the third direction 3A may be defined as the thickness direction of the second substrate 120.

Hereinafter, for convenience of description, the first direction 1A will be described as the length direction of the second substrate 120, the second direction 2A the second direction 2A will be described as the width direction of the second substrate 120, and the third directions 3A will be described as the thickness direction of the second substrate 120.

The second electrode 220 may be disposed on one surface of the second substrate 120. In detail, the second electrode 220 may be disposed on a lower surface of the second substrate 120. That is, the second electrode 220 may be disposed on one surface of the second substrate 120 in which the second substrate 120 and the first substrate 110 face each other. That is, the second electrode 220 may be disposed to face the first electrode 210 on the first substrate 110. That is, the second electrode 220 may be disposed between the first electrode 210 and the second substrate 120.

The second electrode 220 may include a material the same as or similar to that of the first substrate 110 described above.

The second electrode 220 may include a transparent conductive material. For example, the second electrode 220 may include a conductive material having a light transmittance of about 80% or more. As an example, the second electrode 220 may include a metal oxide such as indium tin oxide, indium zinc oxide, copper oxide, tin oxide, zinc oxide, titanium oxide, etc.

The second electrode 220 may have a thickness of about 0.1 μm to about 0.5 μm.

Alternatively, the second electrode 220 may include various metals to realize low resistance. For example, the second electrode 220 may include at least one metal of chromium (Cr), nickel (Ni), copper (Cu), aluminum (Al), silver (Ag), molybdenum (Mo). gold (Au), titanium (Ti), and alloys thereof.

Referring to FIG. 4, the second electrode 220 may be disposed on the entire surface of one surface of the second substrate 120. In detail, the second electrode 220 may be disposed as a surface electrode on one surface of the second substrate 120. However, the embodiment is not limited thereto, and the second electrode 220 may be formed of a plurality of pattern electrodes having a uniform pattern such as a mesh or stripe shape.

For example, the second electrode 220 may include a plurality of conductive patterns. In detail, the second electrode 220 may include a plurality of mesh lines crossing each other and a plurality of mesh openings formed by the mesh lines.

Accordingly, even though the second electrode 220 includes a metal, the second electrode 220 is not visually recognized from the outside, so that visibility may be improved. In addition, the light transmittance is increased by the openings, so that the brightness of the optical path control member according to the embodiment may be improved.

The first substrate 110 and the second substrate 120 may have sizes corresponding to each other. The first substrate 110 and the second substrate 120 may have sizes the same as or similar to each other.

In detail, a first length extending in the first direction 1A of the first substrate 110 may have a size the same as or similar to a second length L2 extending in the first direction 1A of the second substrate 120.

For example, the first length and the second length may have a size of 300 mm to 400 mm.

In addition, a first width extending in the second direction 2A of the first substrate 110 may have a size the same as or similar to a second width extending in the second direction 2A of the second substrate 120.

For example, the first width and the second width may have a size of 150 mm to 200 mm.

In addition, a first thickness extending in the third direction 3A of the first substrate 110 may have a size the same as or similar to a second thickness extending in the third direction 3A of the second substrate 120.

For example, the first thickness and the second thickness may have a size of 30 μm to 200 μm.

Referring to FIG. 1, the first substrate 110 and the second substrate 120 may be disposed to be misaligned from each other.

In detail, the first substrate 110 and the second substrate 120 may be disposed at positions misaligned from each other in the first direction 1A. In detail, the first substrate 110 and the second substrate 120 may be disposed so that side surfaces of the substrates are misaligned from each other.

Accordingly, the first substrate 110 may be disposed to protrude in one direction in the first direction 1A, and the second substrate 120 may be disposed to protrude in the other direction in the first direction 1A.

That is, the first substrate 110 may include a first protrusion protruding in one direction in the first direction 1A, and the second substrate 110 may include a second protrusion protruding in the other direction in the first direction 1A.

Accordingly, the optical path control member 1000 may include a region where the first electrode 210 is exposed on the first substrate 110 and a region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to an external printed circuit board through a connection portion that will be described below.

Alternatively, referring to FIG. 2, the first substrate 110 and the second substrate 120 may be disposed at positions corresponding to each other. In detail, the first substrate 110 and the second substrate 120 may be disposed such that side surfaces thereof correspond to each other.

Accordingly, the first substrate 110 may be disposed to protrude in one direction in the first direction 1A, and the second substrate 120 may also be disposed in one direction in the first direction 1A, that is, may be disposed to protrude in the same direction as that of the first substrate 110.

That is, the first substrate 110 may include a first protrusion protruding in one direction in the first direction 1A, and the second substrate may also include a second protrusion protruding in one direction in the first direction 1A.

That is, the first protrusion and the second protrusion may protrude in the same direction.

Accordingly, the optical path control member 1000 may include a region where the first electrode 210 is exposed on the first substrate 110 and a region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to an external printed circuit board through a connection portion that will be described below.

The optical conversion unit 300 may be disposed between the first substrate 110 and the second substrate 120. In detail, the optical conversion unit 300 may be disposed between the first electrode 210 and the second electrode 220.

Functional layers may be disposed between at least one of between the optical conversion unit 300 and the first substrate 110 or between the optical conversion unit 300 and the second substrate 120.

In detail, a buffer layer 410 that facilitates adhesion between the optical conversion unit 300 and the first substrate 110 may be disposed between the optical conversion unit 300 and the first substrate 110. In addition, an adhesive layer 420 that adheres the second electrode 220 and the optical conversion unit 300 may be disposed between the optical conversion unit 300 and the second substrate 120.

The optical conversion unit 300 may include a plurality of partitioning parts and accommodation parts. Optical conversion particles that move by applying a voltage may be disposed in the accommodation part, and light transmission characteristics of the optical path control member may be changed by the optical conversion particles.

The optical path control member may include a sealing part.

Referring to FIGS. 5 to 7, a sealing part 500 may be disposed on an outer surface of the optical path control member.

The sealing part 500 may be disposed while covering the outer surface of the optical path control member. In detail, the sealing part 500 may be disposed while partially covering the outer surface of the optical path control member. That is, the sealing part 500 may be disposed while extending from the first substrate 110 toward the second substrate 120 and partially covering the outer surface of the optical path control member.

The optical path control member 1000 may include a plurality of side surfaces. In detail, the optical path control member 1000 may include side surfaces extending in the first direction 1A and facing each other and side surfaces extending in the second direction 2A and facing each other.

The sealing part 500 may be disposed to surround the side surfaces of the optical path control member extending in the first direction 1A. For example, the sealing part 500 may be disposed to surround the side surfaces of the optical path control member in which the accommodation part 320 in which the optical conversion particles are disposed is exposed from the optical conversion unit 300.

In detail, as shown in FIG. 5, the sealing part 500 may be partially disposed on the side surface of the optical path control member while covering the accommodation part 320 exposed from the side surface of the optical path control member.

Alternatively, as shown in FIG. 6, the sealing part 500 may be entirely disposed on the side surface of the optical path control member while covering the accommodation part 320 exposed from the side surface of the optical path control member.

In detail, the accommodation part 320 may be disposed to extend from the optical conversion unit 300 in the second direction 2A with respect to the first substrate 110 and the second substrate 120. That is, the plurality of accommodation parts 320 may be disposed to extend in the second direction 2A while being spaced apart from each other.

Accordingly, the accommodation part 320 may be exposed in both lateral directions of the first direction 1A of the optical conversion unit 300. The sealing part 500 may be disposed while covering the accommodation part 320 exposed from the optical conversion unit 300 to protect the optical conversion particles inside the exposed accommodation part.

That is, the sealing part 500 may be disposed on a part of a side surface of the optical conversion unit 300, a part of a lower surface of the first substrate 110, and a part of an upper surface of the second substrate 120. In other words, the sealing part 500 may be disposed on a part of the side surface of the optical conversion unit 300, a part of the lower surface of the first substrate 110, and a part of the upper surface of the second substrate 120 while surrounding the exposed accommodation part of the optical conversion unit.

The sealing part 500 may include a resin material having a viscosity of 300 cP or more.

Alternatively, referring to FIG. 7, the sealing part 500 may be disposed to surround side surfaces of the optical path controlling member extending in the first direction 1A and side surfaces of the optical path controlling member extending in the second direction 2A.

Accordingly, at least one side surface of the side surfaces in the second direction of the optical conversion unit 300 may also be entirely surrounded by the sealing part 500.

Accordingly, in the optical path control member according to the embodiment, the outer surface of the optical conversion unit 300 may be entirely sealed by the sealing part 500. That is, it is possible to prevent the penetration of impurities, such as moisture and air, which may penetrate into the accommodation part from the side surface of the optical conversion unit 300 in the second direction.

That is, during a manufacturing process of the optical path control member, thicknesses of the side surfaces of the optical conversion unit 300 in the second direction may be different from each other due to a tolerance, and a width of any one of the side surfaces in the second direction is formed to be small, so that impurities that may permeate into the accommodation part may permeate into the accommodation part through the partitioning part.

In the optical path control member according to the embodiment, by disposing the sealing part also on the side surface of the optical conversion unit in the second direction, it is possible to effectively prevent the penetration of impurities according to a size of the partitioning part.

Meanwhile, although it is illustrated that the sealing part is disposed on the outer surface of the optical path member in FIGS. 5 to 7, the embodiment is not limited thereto, and the sealing part may be disposed on an upper surface of the optical conversion unit 300.

Referring to FIGS. 8 and 9, unlike FIGS. 1 and 2, the first substrate 110 and the second substrate 120 may have different sizes.

In detail, a first length extending in the first direction 1A of the first substrate 110 may have a size the same as or similar to a second width L2 extending in the first direction 1A of the second substrate 120 within a size range of 300 mm to 400 mm.

In addition, a first width extending in the second direction 2A of the first substrate 110 and a second width extending in the second direction of the second substrate 120 may have different sizes within a size range of 150 mm to 200 mm.

For example, the second width extending in the second direction of the second substrate 120 may be smaller than a size of the first width extending in the second direction 2A of the first substrate 110.

Accordingly, both ends of the optical conversion unit 300 in the second direction may be disposed to be spaced apart from the second substrate 120.

A sealing part 500 and a dam part 600 which are respectively disposed on the optical conversion unit may be disposed at both ends of the optical conversion unit 300 in the second direction.

When the optical conversion material is injected into the accommodation part, the dam part 600 may determine an injection part and an outlet part, and the sealing part 500 may seal the injection part and the outlet part after the optical conversion material is injected.

That is, the sealing part 500 may be disposed on the partitioning part 310 while filling the accommodation part 320 of the optical conversion unit 300 at both ends of the optical conversion unit 300 in the second direction.

Referring to FIGS. 10 and 11, the optical conversion unit 300 may include a partitioning part 310 and an accommodation part 320.

The partitioning part 310 may be defined as a partitioning part dividing the accommodation part. That is, the partitioning part 310 may transmit light as a barrier region dividing a plurality of accommodation parts. In addition, the accommodation part 320 may be defined as a variable region where the accommodation part 320 is switched to a light blocking part and a light transmitting part by applying a voltage.

The partitioning part 310 and the accommodation part 320 may be alternately disposed with each other. The partitioning part 310 and the accommodation part 320 may be disposed to have different widths. For example, a width of the partitioning part 310 may be greater than that of the accommodation part 320.

The partitioning part 310 and the accommodation part 320 may be alternately disposed with each other. In detail, the partitioning part 310 and the accommodation part 320 may be alternately disposed with each other. That is, each of the partitioning parts 310 may be disposed between the accommodation parts 320 adjacent to each other, and each of the accommodation parts 320 may be disposed between the adjacent partitioning parts 310.

The partitioning part 310 may include a transparent material. The partitioning part 310 may include a material that may transmit light.

The partitioning part 310 may include a resin material. For example, the partitioning part 310 may include a photocurable resin material. As an example, the partitioning part 310 may include a UV resin or a transparent photoresist resin. Alternatively, the partitioning part 310 may include urethane resin or acrylic resin.

The partitioning part 310 may transmit light incident on any one of the first substrate 110 and the second substrate 120 toward another substrate.

For example, in FIGS. 10 and 11, light may be emitted from the first substrate 110 by a light source disposed under the first substrate 110, and the light may be incident toward the second substrate 120. In this case, the partitioning part 310 may transmit the light, and the transmitted light may move toward the second substrate 120.

The accommodation part 320 may include the dispersion liquid 320*a* and the optical conversion particles 320*b*. In detail, the accommodation part 320 may be filled by injecting the dispersion liquid 320*a*. A plurality of optical conversion particles 320*b* may be dispersed in the dispersion liquid 320*a*.

The dispersion liquid 320*a* may be a material for dispersing the optical conversion particles 320*b*. The dispersion liquid 320*a* may include a transparent material. The dispersion liquid 320*a* may include a non-polar solvent. In addition, the dispersion liquid 320*a* may include a material capable of transmitting light. For example, the dispersion liquid 320*a* may include at least one of a halocarbon-based oil, a paraffin-based oil, and isopropyl alcohol.

The optical conversion particles 320*b* may be disposed to be dispersed in the dispersion liquid 320*a*. In detail, the plurality of optical conversion particles 320*b* may be disposed to be spaced apart from each other in the dispersion liquid 320*a*.

The optical conversion particles 320*b* may include a material capable of absorbing light. That is, the optical conversion particles 320*b* may be light absorbing particles. The optical conversion particles 320*b* may have a color. For example, the optical conversion particles 320*b* may have a black-based color. As an example, the optical conversion particles 320*b* may include carbon black.

The optical conversion particles 320*b* may have a polarity by charging surfaces thereof. For example, the surfaces of the optical conversion particles 320*b* may be charged with a negative (−) charge. Accordingly, the optical conversion particles 320*b* may move toward the first electrode 210 or the second electrode 220 by applying a voltage.

The light transmittance of the accommodation part 320 may be changed by the optical conversion particles 320*b*. In detail, the accommodation part 320 may be switched to the light blocking part and the light transmitting part by changing the light transmittance due to the movement of the optical conversion particles 320*b*. That is, the accommodation part 320 may change the transmittance of light passing through the accommodation part 320 by dispersion liquid and aggregation of the optical conversion particles 320*b* disposed inside the dispersion liquid 320*a*.

For example, the optical path control member according to the embodiment may be converted from a first mode to a second mode or from the second mode to the first mode by a voltage applied to the first electrode 210 and the second electrode 220.

In detail, in the optical path control member according to the embodiment, the accommodation part 320 becomes the light blocking part in the first mode, and light of a specific angle may be blocked by the accommodation part 320. That is, a viewing angle of the user viewing from the outside is narrowed, so that the optical path control member may be driven in a privacy mode.

In addition, in the optical path control member according to the embodiment, the accommodation part 320 becomes the light transmitting part in the second mode, and in the optical path control member according to the embodiment, light may be transmitted through both the partitioning part 310 and the accommodation part 320. That is, the viewing angle of the user viewing from the outside may be widened, so that the optical path control member may be driven in a share mode.

Switching from the first mode to the second mode, that is, the conversion of the accommodation part 320 from the light blocking part to the light transmitting part may be realized by movement of the optical conversion particles 320*b* of the accommodation part 320. That is, the optical conversion particles 320*b* may have a charge on the surfaces thereof and may move toward the first electrode or the second electrode by applying a voltage according to characteristics of the charge. That is, the optical conversion particles 320*b* may be electrophoretic particles In detail, the accommodation part 320 may be electrically connected to the first electrode 210 and the second electrode 220.

In this case, when a voltage is not applied to the optical path control member from the outside, the optical conversion particles 320*b* of the accommodation part 320 are uniformly dispersed in the dispersion liquid 320*a*, and the accommodation part 320 may block light by the optical conversion particles. Accordingly, in the first mode, the accommodation part 320 may be driven as the light blocking part.

Alternatively, when a voltage is applied to the optical path control member from the outside, the optical conversion particles 320*b* may move. For example, the optical conversion particles 320*b* may move toward one end or the other end of the accommodation part 320 by a voltage transmitted through the first electrode 210 and the second electrode 220. That is, the optical conversion particles 320*b* may move from the accommodation part 320 toward the first electrode 210 or the second electrode 220.

In detail, when a voltage is applied to the first electrode 210 and/or the second electrode 220, an electric field is formed between the first electrode 210 and the second electrode 220, and the optical conversion particles 320*b* charged with the negative charge may move toward a positive electrode of the first electrode 210 and the second electrode 220 using the dispersion liquid 320*a* as a medium.

That is, when the voltage is applied to the first electrode 210 and/or the second electrode 220, as shown in FIG. 10, the optical conversion particles 320*b* may move toward the first electrode 210 in the dispersion liquid 320*a*. That is, the optical conversion particles 320*b* may move in one direction, and the accommodation part 320 may be driven as the light transmitting part.

Alternatively, when the voltage is not applied to the first electrode 210 and/or the second electrode 220, as shown in FIG. 11, the optical conversion particles 320*b* may be uniformly dispersed in the dispersion liquid 320*a* to drive the accommodation part 320 as the light blocking part.

Accordingly, the optical path control member according to the embodiment may be driven in two modes according to a user's surrounding environment. That is, when the user requires light transmission only at a specific viewing angle, the accommodation part is driven as the light blocking part, or in an environment in which the user requires high brightness, a voltage may be applied to drive the accommodation part as the light transmitting part.

Therefore, since the optical path control member according to the embodiment may be implemented in two modes according to the user's requirement, the optical path control member may be applied regardless of the user's environment.

As described above, the dispersion liquid 320a in which the optical conversion particles 320b are dispersed may be disposed inside the accommodation part 320.

The dispersion liquid 320a may be disposed in each accommodation part in the direction from the injection part toward the outlet part using a capillary injection method. In this case, according to characteristics of the dispersion liquid 320a and characteristics of the inside of the accommodation part 320 in contact with the dispersion liquid 320a and the adhesive layer 420, filling properties of the injected dispersion liquid may be changed.

That is, when the inside of the accommodation part 320 in contact with the dispersion liquid and the adhesive layer 420 has hydrophobicity, the dispersion liquid 320a having hydrophobicity may have improved filling properties inside the accommodation part.

Therefore, in the optical path control member according to the embodiment, by controlling permittivity and composition of the dispersion liquid 320a and controlling a contact angle between the dispersion liquid and the inside of the accommodation part 320 and the adhesive layer 420 so that the characteristics of the accommodation part and the adhesive layer. Has hydrophobicity similar to that of the dispersion liquid, thereby improving the filling properties of the dispersion liquid.

Referring to FIGS. 12 to 14, the dispersion liquid 320a disposed in the accommodation part 320 may be disposed in direct contact with a bottom surface BS of the accommodation part 320, an inner surface IS of the accommodation part 320, and a lower surface of the adhesive layer 420.

The dispersion liquid of the optical path control member according to the embodiment may have different contact angles on the inner surface IS of the accommodation part 320 and the lower surface of the adhesive layer 420.

In detail, when the dispersion liquid 320a is in contact with the bottom surface BS of the accommodation part 320 and the inner surface IS of the accommodation part, the dispersion liquid 320a may have a first contact angle θ1. In addition, when the dispersion liquid 320a is in contact with the lower surface of the adhesive layer 420, the dispersion liquid 320a may have a second contact angle θ2.

Here, the first contact angle θ1 may be defined as an angle between a surface of a droplet of the dispersion liquid and the bottom and inner surfaces of the accommodation part when the dispersion liquid is dropped on the bottom and inner surfaces of the accommodation part.

In addition, the second contact angle θ2 may be defined as an angle between a surface of a droplet of the dispersion liquid and the lower surface of the adhesive layer when the dispersion liquid is dropped on the lower surface of the adhesive layer.

The first contact angle θ1 and the second contact angle θ2 may be 20° or less.

In detail, the first contact angle θ1 may be 20° or less. In more detail, the first contact angle θ1 may be 5° to 20°. In more detail, the first contact angle θ1 may be 8° to 15°.

When the first contact angle θ1 has a contact angle exceeding 20°, the bottom surface BS of the accommodation part 320 in contact with the dispersion liquid 320a and the inner surface IS of the accommodation part have a property close to hydrophilicity, and thus the dispersion liquid 320a having hydrophobicity may not be easily filled in the accommodation part.

In addition, when the first contact angle θ1 is formed to be less than 5°, a weight % of the optical conversion particles 320b dispersed inside the dispersion liquid 320a may be changed, and thus the optical conversion characteristics of the optical path control member may be deteriorated.

In addition, the second contact angle θ2 may be 20° or less. In more detail, the second contact angle θ2 may be 3° to 15°. In more detail, the second contact angle θ2 may be 5° to 10°.

When the second contact angle θ2 has a contact angle exceeding 20°, the adhesive layer in contact with the dispersion liquid 320a has a property close to hydrophilicity, and thus the dispersion liquid 320a having hydrophobicity may not be easily filled in the accommodation part by the adhesive layer.

In addition, when the second contact angle θ2 is formed to be less than 3°, a weight % of the optical conversion particles 320b dispersed inside the dispersion liquid 320a may be changed, and thus the optical conversion characteristics of the optical path control member may be deteriorated.

That is, since both the first contact angle θ1 of the bottom surface BS of the accommodation part 320 and the inner surface IS of the accommodation part that are in contact with the dispersion liquid 320a having hydrophobicity and the second contact angle θ2 of the lower surface of the adhesive layer 420 that is in contact with the dispersion liquid 320a are formed to be 20° or less, the bottom surface BS of the accommodation part 320, the inner surface IS of the accommodation part, and the lower surface of the adhesive layer 420 may have hydrophobicity. That is, the bottom surface BS of the accommodation part 320, the inner surface IS of the accommodation part, and the lower surface of the adhesive layer 420 may also have hydrophobicity similar to that of the dispersion liquid 302a.

In addition, the first contact angle θ1 and the second contact angle θ2 may be different. In detail, a size of the first contact angle θ1 may be greater than a size of the second contact angle θ2. In addition, a difference θ1-θ2 between the first contact angle θ1 and the second contact angle θ2 may be 10° or less. In detail, the difference θ1-θ2 between the first contact angle θ1 and the second contact angle θ2 may be 1° to 5°. In more detail, the difference θ1-θ2 between the first contact angle θ1 and the second contact angle θ2 may be 3° to 5°.

By forming the difference between the first contact angle θ1 and the second contact angle θ2 within the above range, filling properties and filling uniformity of the dispersion liquid filled inside the accommodation part may be improved.

In detail, it is possible to reduce a difference between a filling speed of the dispersion liquid in contact with the accommodation part while having the first contact angle and a filling speed of the dispersion liquid in contact with the adhesive layer while having the second contact angle. Therefore, the filling speed of the dispersion liquid filled inside the accommodation part may be filled at a similar speed regardless of a type of surfaces with which the dispersion liquid is in contact.

Therefore, it is possible to improve the filling uniformity of the plurality of accommodation parts, and it is possible to improve the filling properties and the filling speed in each accommodation part.

The dispersion liquid 320a may include a solvent, optical conversion particles 320b, and a dispersant. In order to control the sizes of the first contact angle θ1 and the second contact angle θ2, a composition ratio of the dispersion liquid 320a may be controlled at a certain ratio.

In detail, the dispersion liquid 320a may include a solvent including at least one of a halocarbon-based oil, a paraffin-based oil, and isopropyl alcohol.

The solvent may be included in an amount of 89.5 wt % to 94.7 wt % with respect to a total weight of the dispersion liquid.

In addition, the optical conversion particles 320b may include carbon black particles. The optical conversion particles 320b may be included in an amount of 1 wt % to 3.5 wt % with respect to the total weight of the dispersion liquid.

In addition, the dispersion liquid may include a dispersant capable of uniformly dispersing the optical conversion particles in the solvent.

The dispersant may be included in an amount of 1 wt % to 1.8 wt % with respect to the total weight of the dispersion liquid.

When the solvent, the optical conversion particles 320b, and the dispersant are out of the weight % range, the first contact angle of the dispersion liquid and the accommodation part and the second contact angle of the dispersion liquid and the adhesive layer increase, and accordingly, the accommodation part and the adhesive layer is close to hydrophilicity, and thus the filling properties of the dispersion liquid having hydrophobicity may be deteriorated.

In addition, the solvent may have permittivity of a certain size. In detail, the permittivity of the solvent may be less than 7.5. In more detail, the permittivity of the solvent may be 1 to less than 7.5. In more detail, the permittivity of the solvent may be 2 to 3.

When the permittivity of the solvent is 7.5 or more, even though the composition ratio is satisfied, the first contact angle of the dispersion liquid and the accommodation part and the second contact angle of the dispersion liquid and the adhesive layer increase by the permittivity, and accordingly, the accommodation part and the adhesive layer is close to hydrophilicity, and thus the filling properties of the dispersion liquid having hydrophobicity may be deteriorated.

Meanwhile, the accommodation part may be disposed in a different shape in consideration of driving characteristics and the like.

Referring to FIGS. 15 and 16, in an optical path control member according to another embodiment, both ends of an accommodation part 320 may be disposed in contact with a buffer layer 410 and an adhesive layer 420 unlike FIGS. 10 and 11.

For example, a lower portion of the accommodation part 320 may be disposed in contact with the buffer layer 410, and an upper portion of the accommodation part 320 may be disposed in contact with the adhesive layer 420.

Accordingly, a distance between the accommodation part 320 and the first electrode 210 may be reduced, so that the voltage applied from the first electrode 210 may be smoothly transmitted to the accommodation part 320.

Accordingly, a moving speed of the optical conversion particles 320b inside the accommodation part 320 may be improved, and thus the driving characteristics of the optical path control member may be improved.

In addition, referring to FIGS. 17 and 18, in the optical path control member according to the embodiment, unlike FIGS. 10 and 11, the accommodation part 320 may be disposed while having a constant inclination angle θ.

In detail, referring to FIGS. 17 and 18, the accommodation part 320 may be disposed to have an inclination angle θ of greater than 0° to less than 90° with respect to the first substrate 110. In detail, the accommodation part 320 may extend upward while having an inclination angle θ of greater than 0° to less than 90° with respect to one surface of the first substrate 110.

Accordingly, when the optical path control member is used together with a display panel, moire caused by an overlapping phenomenon between a pattern of the display panel and the accommodation part 320 of the optical path control member may be alleviated, thereby improving user visibility.

The optical path control member according to the embodiment may control the contact angle of the dispersion liquid disposed inside the accommodation part.

In detail, the contact angle between the inner surface and the bottom surface of the accommodation part in contact with the dispersion liquid in the accommodation part and the lower surface of the adhesive layer may be controlled to a size of 20° or less.

Accordingly, the inner surface and the bottom surface of the accommodation part and the lower surface of the adhesive layer having a contact angle of 20° or less may have properties close to hydrophobicity. Therefore, when the dispersion liquid having hydrophobicity is filled inside the accommodation part, the dispersion liquid is filled through contact surfaces having similar properties, so that the filling speed and filling properties of the dispersion liquid may be improved.

In addition, the dispersion liquid may control the difference between the first contact angle with the inner surface and the bottom surface of the accommodation part and the second contact angle with the adhesive layer in a certain size range. Accordingly, a difference between a speed in a region in contact with the accommodation part and a speed in a region in contact with the adhesive layer may be reduced.

Therefore, since the dispersion liquid may be filled in the accommodation part at a uniform speed, the uniformity of filling of the dispersion liquid may be improved.

In addition, the dispersion liquid may have a certain composition, and the solvent of the dispersion liquid may have permittivity in a certain size range. Accordingly, by controlling the composition of the dispersion liquid and the permittivity of the solvent, the first contact angle and the second contact angle may have a size of 20° or less.

That is, in the optical path control member according to the embodiment, it is possible to have improved characteristics and reliability by controlling contact angles of surfaces in contact with the dispersion liquid to improve the filling properties in the accommodation part and to improve the filling uniformity of the plurality of accommodation parts.

Hereinafter, an optical path control member according to another embodiment will be described with reference to FIGS. 19 and 20.

Referring to FIGS. 19 and 20, an optical conversion material may be disposed in the accommodation part 320. In detail, an optical conversion material having a constant viscosity may be disposed inside the accommodation part 320.

The optical conversion material may include a solvent 320a, optical conversion particles 320b, and a liquid crystal 320c. The optical conversion particles 320b and the liquid crystal 320c may be dispersed in the solvent 320a.

That is, the accommodation part 320 may be filled by injecting with the solvent 320a in which the optical conversion particles 320b and the liquid crystal 320c are dispersed.

The solvent 320a may be a material that disperses the optical conversion particles 320b and the liquid crystal 320c.

The dispersion liquid 320*a* may include a transparent material. The solvent 320*a* may include a material capable of transmitting light.

The solvent 320*a* may include a polar solvent or a non-polar solvent.

For example, the solvent 320*a* may include a material having an aromatic ring to have polarity. For example, the solvent 320*a* may include a polar hydrocarbon having an aromatic ring.

Alternatively, the solvent 320*a* may include at least one of non-polar halocarbon-based oil, paraffin-based oil, and isopropyl alcohol.

The optical conversion particles 320*b* may be disposed to be dispersed in the solvent 320*a*. In detail, the plurality of optical conversion particles 320*b* may be disposed to be spaced apart from each other in the solvent 320*a*.

The liquid crystal 320*c* may be dispersed in the solvent 320*a*.

As the optical conversion material includes the liquid crystal 320*c*, the optical conversion material may have a low viscosity. Accordingly, the moving speed of the optical conversion particles 320*b* dispersed in the solvent 320*a* may be improved. That is, it is possible to improve the moving speed of the optical conversion particles 320*b* in inverse proportion to the viscosity of the solvent.

Accordingly, the moving speed of the optical conversion particles 320*b* may be increased, thereby improving a driving speed of the optical path controlling member.

In addition, as the optical conversion material includes the liquid crystal 320*c*, the optical conversion material may have low volatility.

That is, in case of a general low-viscosity material, there is a problem that an evaporation rate is increased due to a decrease in a flash point, but the optical conversion material may prevent the problem by the liquid crystal 320*c* while implementing low viscosity, thereby having low volatility while implementing low viscosity.

In addition, when a voltage is applied to the optical path control member, the liquid crystal 320*c* may facilitate movement of the moving optical conversion particles 320*b*.

Referring to FIG. 19, when a voltage is not applied to the optical path control member, the liquid crystal 320*c* may be arranged in an irregular direction in the solvent 320*a*.

However, referring to FIG. 20, when a voltage is applied to the optical path control member, the liquid crystal 320*c* may be arranged in a regular direction in the solvent 320*a*. That is, a length direction of the liquid crystal 320*c* may be arranged in a direction in which the first electrode 210 and the second electrode 220 face each other.

Accordingly, when the optical conversion particles 320*b* move toward the first electrode 210 or the second electrode 220, the optical conversion particles 320*b* may easily move by the liquid crystal 320*c* arranged in a movement direction of the optical conversion particles 320*b*, thereby improving the driving speed of the optical conversion particles.

The liquid crystal 320*c* may be included in a constant weight % range with respect to a total weight of the optical conversion material. The liquid crystal 320*c* may be included in an amount of 10 wt % or less with respect to the total weight of the optical conversion material. In detail, the liquid crystal 320*c* may be included in an amount of 1 wt % to 10 wt % with respect to the total weight of the optical conversion material. In more detail, the liquid crystal 320*c* may be included in an amount of 1 wt % to 5 wt % with respect to the total weight of the optical conversion material.

When the liquid crystal 320*c* is included in an amount exceeding 10 wt % with respect to the total amount of the optical conversion material, a phenomenon in which the liquid crystals 320*c* are aggregated with each other in the solvent 320*a* may occur.

In particular, when the solvent 320*a* includes a non-polar solvent, the liquid crystals 320*c* having polarity may not be dispersed and may be aggregated with each other.

The optical conversion particles 320*b* and the liquid crystal 320*c* may be included in different weight % ranges with respect to the total weight of the optical conversion material.

For example, the weight % of the optical conversion particles 320*b* with respect to the total weight of the optical conversion material may be greater than or smaller than the weight % of the liquid crystal 320*c* with respect to the total weight of the optical conversion material.

In detail, a ratio of the weight % of the optical conversion particles 320*b* with respect to the total weight of the optical conversion material and the weight % of the liquid crystal 320*c* with respect to the total weight of the optical conversion material may be 1:0.2 to 1:3.

When the ratio of the weight % of the optical conversion particles 320*b* with respect to the total weight of the optical conversion material and the weight % of the liquid crystal 320*c* with respect to the total weight of the optical conversion material is less than 1:0.2, a content of the liquid crystal in the optical conversion material is reduced, so that the viscosity of the optical conversion material may be increased, and thus the driving speed of the optical path controlling member may be lowered.

In addition, when the ratio of the weight % of the optical conversion particles 320*b* with respect to the total weight of the optical conversion material and the weight % of the liquid crystal 320*c* with respect to the total weight of the optical conversion material exceeds 1:3, an effect of improving the driving speed may be insignificant compared to an amount in which the content of the liquid crystal in the optical conversion material is increased, and the liquid crystals may be agglomerated with each other, and thus the driving characteristics of the optical path control member may be deteriorated.

Meanwhile, as described above, the solvent 320*a* may have a polarity. When the solvent 320*a* has a polarity, dispersibility of the liquid crystal 320*c* disposed in the solvent 320*a* may be improved.

That is, since both the solvent 320*a* and the liquid crystal 320*c* have polarity, the aggregation of the liquid crystals 320*c* with each other in the solvent 320*a* may be minimized.

A polar magnitude of the solvent 320*a* and a polar magnitude of the liquid crystal 320*c* may be different from each other. In detail, the polar magnitude of the solvent 320*a* may be smaller than the polar magnitude of the liquid crystal 320*c*.

A difference between the polar magnitude of the solvent 320*a* and the polar magnitude of the liquid crystal 320*c* may be 0.08 to 0.8.

When the difference between the polar magnitude of the solvent 320*a* and the polar magnitude of the liquid crystal 320*c* is less than 0.08, the moving speed of the optical conversion material in the solvent may be reduced due to the increase in the polar magnitude of the solvent. In addition, when the difference between the polar magnitude of the solvent 320*a* and the polar magnitude of the liquid crystal 320*c* exceeds 0.8, the liquid crystal may be aggregated with each other in the solvent due to a polarity difference between the solvent and the liquid crystal.

Hereinafter, a method of manufacturing the optical path control member according to the embodiment will be described with reference to FIGS. 21 to 28. A method of manufacturing the optical path control member to be described below will be mainly described with respect to a case in which the first substrate and the second substrate have the same size as shown in FIGS. 1 and 2.

Referring to FIG. 21, a first substrate 110 and an electrode material for forming a first electrode are prepared. Then, the first electrode may be formed by coating or depositing the electrode material on one surface of the first substrate. In detail, the electrode material may be formed on the entire surface of the first substrate 110. Accordingly, the first electrode 210 formed as a surface electrode may be formed on the first substrate 110.

Subsequently, referring to FIG. 22, a resin layer 350 may be formed by coating a resin material on the first electrode 210. In detail, the resin layer 350 may be formed by applying a urethane resin or an acrylic resin on the first electrode 210.

In this case, before disposing the resin layer 350, a buffer layer 410 may be additionally disposed on the first electrode 210. In detail, by disposing the resin layer 350 on the buffer layer 410 after disposing the buffer layer 410 having good adhesion to the resin layer 350 on the first electrode 210, it is possible to improve the adhesion of the resin layer 350.

For example, the buffer layer 410 may include an organic material including a lipophilic group such as —CH—, an alkyl group, etc. Having good adhesion to the electrode and a hydrophilic group such as —NH, —OH, —COOH, etc. Having a good adhesion to the resin layer 410.

The resin layer 350 may be disposed on a partial region of the first substrate 110. That is, the resin layer 350 may be disposed in an area smaller than that of the first substrate 110. Accordingly, a region where the resin layer 350 is not disposed and the first electrode 210 is exposed may be formed on the first substrate 110. In addition, when the buffer layer 410 is disposed on the first electrode 210, a region where the buffer layer 410 is exposed may be formed.

Subsequently, referring to FIG. 23, the resin layer 350 may be patterned to form a plurality of partitioning parts 310 and a plurality of accommodation parts 320 in the resin layer 350. In detail, an engraved portion may be formed in the resin layer 350 to form an engrave-shaped accommodation part 320 and the emboss-shaped partitioning part 310 between the engraved portions.

Accordingly, an optical conversion unit 300 including the partitioning part 310 and the accommodation part 320 may be formed on the first substrate 110.

In addition, the buffer layer 410 exposed on the first electrode 210 may be removed to expose the first electrode 210 in a region where the first substrate 110 protrudes.

Subsequently, referring to FIG. 24, a second electrode and an electrode material for forming a second substrate 120 and are prepared. Then, the second electrode may be formed by coating or depositing the electrode material on one surface of the second substrate. In detail, the electrode material may be formed on the entire surface of the second substrate 120. Accordingly, the second electrode 220 formed as a surface electrode may be formed on the second substrate 120.

A size of the second substrate 120 may be smaller than that of the first substrate 110. In addition, the size of the second substrate 120 may be smaller than that of the resin layer 350.

In detail, a size of a second length extending in a first direction of the second substrate 120 may be greater than a third length extending in the first direction of the resin layer 350, and a size of a second width extending in a second direction of the second substrate 120 may be smaller than a size of a third width extending in the second direction of the resin layer 350.

Subsequently, referring to FIG. 25, an adhesive layer 420 may be formed by coating an adhesive material on the second electrode 220. In detail, a light-transmitting adhesive layer capable of transmitting light may be formed on the second electrode 220. For example, the adhesive layer 420 may include an optical transparent adhesive layer OCA.

The adhesive layer 420 may be disposed on a partial region of the optical conversion unit 300. That is, the adhesive layer 420 may be disposed in an area smaller than that of the optical conversion unit 300. Accordingly, a region where the adhesive layer 410 is not disposed and the optical conversion unit 300 is exposed may be formed on the optical conversion unit 300.

Subsequently, referring to FIG. 26, the first substrate 110 and the second substrate 120 may be adhered. In detail, the second substrate 120 may be disposed on the optical conversion unit 300, and the second substrate 120 and the optical conversion unit 300 may be adhered through the adhesive layer 420 disposed under the second substrate 120.

The optical conversion unit 300 and the second substrate 120 may be sequentially stacked in the thickness direction of the first substrate 110, the optical conversion unit 300, and the second substrate 120.

In this case, since the second substrate 120 is disposed in a size smaller than the size of the resin layer 350, a plurality of partitioning parts 310 and accommodation parts 320 may be exposed in a region where the second substrate 120 is not disposed on the optical conversion unit 300.

In detail, since the size of the second width extending in the second direction of the second substrate 120 is smaller than the size of the third width extending in the second direction of the resin layer 350, the plurality of partitioning parts 310 and the accommodation part 320 may be exposed in an end region of at least one of one end and the other end facing in a width direction of the resin layer 350.

Subsequently, an optical conversion material 380 may be injected between the partitioning parts 310, that is, the accommodation parts 320. In detail, an optical conversion material in which light absorbing particles such as carbon black are dispersed in an electrolyte solvent including a paraffinic solvent and the like may be injected between the partitioning parts, that is, the accommodation parts 320. That is, the optical conversion material 380 including the above-described dispersion liquid may be injected into the accommodation part.

For example, after disposing a dam extending in a length direction of the optical conversion unit 300 on the accommodation part and the partitioning part of the optical conversion unit 300 on which the second substrate 120 is not disposed, the electrolyte solvent may be injected into the accommodation part 320 by a capillary injection method between the dam and a side surface of the optical conversion unit 300.

Subsequently, referring to FIG. 27, one optical path control member may be manufactured by cutting the optical conversion unit 300. In detail, the optical conversion unit 300 may be cut in the length direction of the optical conversion unit 300. That is, the optical conversion unit 300, the buffer layer 410 under the optical conversion unit 300, the first electrode 210, and the first substrate 110 may be cut along the dotted line shown in FIG. 22. A plurality of optical path control members A and B may be formed by the cutting process, and FIG. 23 is a view showing one of the plurality of optical path control members.

In detail, the optical conversion unit 300 may be cut so that the side surfaces of the first substrate 110, the second substrate 120, and the optical conversion unit 300 in the width direction may be disposed on the same plane or both ends of the second substrate in the second direction are disposed on a cross-section perpendicular to both ends of the optical conversion unit in the second direction.

Accordingly, both ends of the second substrate 120, the second electrode 220, or the adhesive layer 420 in the second direction and both ends of the optical conversion unit 300 in the second direction may be disposed on the same plane.

That is, the both ends of the adhesive layer 420 in the second direction and the both ends of the optical conversion unit 300 in the second direction may be connected to each other.

Alternatively, the both ends of the second substrate 120, the second electrode 220, or the adhesive layer 420 in the second direction may be disposed more outside than the both ends of the optical conversion unit 300 in the second direction according to an error during the process.

Subsequently, the buffer layer 410 disposed on the first substrate 110 and/or the adhesive layer 420 disposed under the second substrate 120 may be partially removed to form a connection portion in which the electrode is exposed. In detail, when the buffer layer 410 is disposed on the first electrode where the optical conversion unit 300 is not disposed on an upper surface of the first substrate 110, a first connection portion 211 may be formed on the first substrate 110 by removing a part of the first buffer layer 410 to expose the first electrode 210 or by not disposing the buffer layer 410 on the first electrode on which the optical conversion unit 300 is not disposed from the beginning. In addition, when the adhesive layer 420 is disposed on the second electrode where the optical conversion unit 300 is not disposed on a lower surface of the second substrate 120, a second connection portion 221 may be formed under the second substrate 120 by removing a part of the adhesive layer 420 or by not disposing the adhesive layer on the second electrode on which the optical conversion unit 300 is not disposed during the adhesive process.

A printed circuit board or a flexible printed circuit board may be connected to the connection portions through an anisotropic conductive film (ACF) or the like, and the printed circuit board may be connected to an external power source to apply a voltage to the optical path control member.

Subsequently, referring to FIG. 28, a sealing part 500 may be disposed through a sealing material. In detail, the sealing part 500 may be disposed in contact with each of side surfaces extending in the first direction, each of side surfaces extending in the second direction of the optical path control member, and upper and lower portions of the optical path control member.

Alternatively, the sealing part 500 may be disposed in contact with each of the side surfaces extending in the first direction of the optical path controlling member and the upper and lower portions of the optical path controlling member.

Accordingly, by sealing the accommodation part exposed to the outside by the sealing part 500, that is, the dispersion liquid in which the optical conversion particles are dispersed from the outside, denaturation of the optical conversion particles due to external moisture, oxygen, or the like may be prevented.

Hereinafter, the present invention will be described in more detail through the filling properties of the dispersion liquid of the optical path control member according to the Examples and Comparative Examples. Such Examples are merely illustrative in order to describe the present invention in more detail. Therefore, the present invention is not limited to the Examples.

Example 1

After disposing a first electrode on a first substrate, a resin layer was formed on the first electrode. In this case, the resin layer included an acrylate-based resin.

Then, the resin layer was patterned to form an optical conversion unit including a partitioning part and an accommodation part between the partitioning parts on the resin layer.

Next, after a second electrode was disposed on a second substrate, an adhesive layer was disposed on the second electrode, and the second electrode and the optical conversion unit were adhered.

Then, after forming a dam spaced apart from one end and the other end of the accommodation part, an optical conversion material was injected through a space between the dam and the accommodation part.

In this case, the optical conversion material included a solvent, carbon black, and a dispersant.

Then, a first contact angle $\theta 1$ between contact surfaces of the optical conversion material and the accommodation part and a second contact angle $\theta 2$ between the optical conversion material and the adhesive layer were measured.

Example 2

After an optical path control member was manufactured in the same manner as in Example 1 except that a composition ratio of the optical conversion material was different as shown in Table 1, the first contact angle $\theta 1$ between contact surfaces of the optical conversion material and the accommodation part and the second contact angle $\theta 2$ between the optical conversion material and the adhesive layer were measured.

Example 3

After the optical path control member was manufactured in the same manner as in Example 1 except that the composition ratio of the optical conversion material was different as shown in Table 1, the first contact angle $\theta 1$ between the contact surfaces of the optical conversion material and the accommodation part and the second contact angle $\theta 2$ between the optical conversion material and the adhesive layer were measured.

Example 4

After the optical path control member was manufactured in the same manner as in Example 1 except that the composition ratio of the optical conversion material was different as shown in Table 1, the first contact angle $\theta 1$ between the contact surfaces of the optical conversion material and the accommodation part and the second contact angle $\theta 2$ between the optical conversion material and the adhesive layer were measured.

Ccomparative Example 1

After manufacturing the optical path control member in the same manner as in Example 1, except that the composition ratio of the optical conversion material and permittivity of a solvent were different as shown in Table 1, the first contact angle θ1 between the contact surfaces of the optical conversion material and the accommodation part and the second contact angle θ2 between the optical conversion material and the adhesive layer were measured.

Ccomparative Example 2

After manufacturing the optical path control member in the same manner as in Example 1, except that the composition ratio of the optical conversion material and the permittivity of the solvent were different as shown in Table 1, the first contact angle θ1 between the contact surfaces of the optical conversion material and the accommodation part and the second contact angle θ2 between the optical conversion material and the adhesive layer were measured.

Comparative Example 3

After manufacturing the optical path control member in the same manner as in Example 1, except that the composition ratio of the optical conversion material and the permittivity of the solvent were different as shown in Table 1, the first contact angle θ1 between the contact surfaces of the optical conversion material and the accommodation part and the second contact angle θ2 between the optical conversion material and the adhesive layer were measured.

Comparative Example 4

After manufacturing the optical path control member in the same manner as in Example 1, except that the composition ratio of the optical conversion material and the permittivity of the solvent were different as shown in Table 1, the first contact angle θ1 between the contact surfaces of the optical conversion material and the accommodation part and the second contact angle θ2 between the optical conversion material and the adhesive layer were measured.

TABLE 1

|  | Solvent (wt %) | Solute (wt %) | Dispersant (wt %) | Solvent permittivity | First contact angle (°) | Second contact angle (°) | Filling properties |
| --- | --- | --- | --- | --- | --- | --- | --- |
| Example 1 | 94.7 | 3.5 | 1.6 | 2.1 | 8.3 | 4.4 | high |
| Example 2 | 93.5 | 3.5 | 3 | 2.1 | 10.9 | 7.4 | high |
| Example 3 | 91.5 | 3.5 | 5 | 2.1 | 14.1 | 8.9 | high |
| Example 4 | 89.5 | 3.5 | 7 | 2.1 | 18.7 | 15 | high |
| Comparative Example 1 | 93.5 | 3.5 | 3 | 7.5 | 20.8 | 47 | low |
| Comparative Example 2 | 83.5 | 3.5 | 15 | 7.5 | 16.7 | 23 | low |
| Comparative Example 3 | 93.5 | 3.5 | 3 | 40 | 45.3 | 54 | low |
| Comparative Example 4 | 90.5 | 3.5 | 6 | 2.1 | 17.8 | 4.1 | medium |

Referring to Table 1, in the optical conversion material of the optical path control member according to Examples, both the first contact angle θ1 and the second contact angle θ2 have a value of 20° or less, and accordingly, it can be seen that both the resin layer and the adhesive layers have hydrophobicity similar to that of the dispersion liquid.

Accordingly, it can be seen that the filling properties of the optical conversion material according to Examples are improved.

On the other hand, in the optical conversion material of the optical path control member according to Comparative Examples 1 to 3, at least one of the first contact angle θ1 and the second contact angle θ2 has a value exceeding 20°, and thus, it can be seen that any one of the resin layer and the adhesive layer has hydrophilicity different from that of the dispersion.

Accordingly, it can be seen that the filling properties of the optical conversion material according to Comparative Examples 1 to 3 are deteriorated.

In addition, referring to Comparative Example 4, when a difference between the first contact angle θ1 and the second contact angle θ2 exceeds 10°, it can be seen that the filling properties are deteriorated depending on a difference in the filling speed of the optical conversion material in contact with the adhesive layer and the resin layer.

Hereinafter, referring to FIGS. 29 to 33, a display device to which an optical path control member according to an embodiment is applied will be described.

Referring to FIGS. 29 and 30, an optical path control member 1000 according to an embodiment may be disposed on or under a display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the optical path control member and the display panel, the optical path control member and the display panel may be adhered after the release film is removed.

Meanwhile, referring to FIGS. 29 and 30, one end or one end and the other end of the optical path control member may protrude, and the optical conversion unit may not be disposed at the protruding portion. The protrusion region is an electrode connection portion in which the first electrode 210 and the second electrode 220 are exposed, and may connect an external printed circuit board and the optical path control member through the electrode connection portion.

The display panel 2000 may include a first' substrate 2100 and a second' substrate 2200. When the display panel 2000 is a liquid crystal display panel, the optical path control member may be formed under the liquid crystal panel. That is, when a surface viewed by the user in the liquid crystal panel is defined as an upper portion of the liquid crystal panel, the optical path control member may be disposed under the liquid crystal panel. The display panel 2000 may be formed in a structure in which the first' substrate 2100 including a thin film transistor (TFT) and a pixel electrode and the second' substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first' substrate 2100 and the second' substrate 2200 is bonded to the first' substrate 2100 with the liquid crystal layer interposed therebetween. That is, a thin film transistor may be formed on the first' substrate 2100, a protective film may be formed on the thin film transistor, and a color filter layer may be formed on the protective film. In addition, a pixel electrode in contact with the thin film transistor may be formed on the first' substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 29, the optical path control member may be disposed under the liquid crystal panel and on the backlight unit 3000, and the optical path control member may be disposed between the backlight unit 3000 and the display panel 2000.

Alternatively, as shown in FIG. 30, when the display panel 2000 is an organic light emitting diode panel, the optical path control member may be formed on the organic light emitting diode panel. That is, when the surface viewed by the user in the organic light emitting diode panel is defined as an upper portion of the organic light emitting diode panel, the optical path control member may be disposed on the organic light emitting diode panel. The display panel 2000 may include a self-luminous element that does not require a separate light source. In the display panel 2000, a thin film transistor may be formed on the first' substrate 2100, and an organic light emitting element in contact with the thin film transistor may be formed. The organic light emitting element may include an anode, a cathode, and an organic light emitting layer formed between the anode and the cathode. In addition, the second' substrate 2200 configured to function as an encapsulation substrate for encapsulation may be further included on the organic light emitting element.

That is, light emitted from the display panel 2000 or the backlight unit 3000 may move from the second substrate 120 toward the first substrate 110 of the optical path control member.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection preventing polarizing plate.

In addition, an additional functional layer 1300 such as an anti-reflection layer, an anti-glare, or the like may be further disposed on the optical path control member 1000. Specifically, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

It is shown in the drawings that the optical path control member is disposed at an upper portion of the display panel, but the embodiment is not limited thereto, and the optical path control member may be disposed at various positions such as a position in which light is adjustable, that is, a lower portion of the display panel, or between a second substrate and a first substrate of the display panel, or the like.

In addition, it is shown in the drawings that the optical conversion unit of the optical path control member according to the embodiment is in a direction parallel or perpendicular to an outer surface of the second substrate, but the optical conversion unit is formed to be inclined at a predetermined angle from the outer surface of the second substrate. Through this, a moire phenomenon occurring between the display panel and the optical path control member may be reduced.

Referring to FIGS. 31 to 33, an optical path control member according to an embodiment may be applied to various display devices.

Referring to FIGS. 31 to 33, the optical path control member according to the embodiment may be applied to a display device that displays a display.

For example, when power is applied to the optical path control member as shown in FIG. 31, the accommodation part functions as the light transmitting part, so that the display device may be driven in the share mode, and when power is not applied to the optical path control member as shown in FIG. 32, the accommodation part functions as the light blocking part, so that the display device may be driven in the privacy mode.

Accordingly, a user may easily drive the display device in the privacy mode or a normal mode by applying power.

Light emitted from the backlight unit or the self-luminous element may move from the first substrate toward the second substrate. Alternatively, the light emitted from the backlight unit or the self-luminous element may also move from the second substrate toward the first substrate.

In addition, referring to FIG. 33, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Further, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical path control member comprising:
a first substrate;
a first electrode disposed on the first substrate;
a second substrate disposed on the first substrate;
a second electrode disposed under the second substrate;
an optical conversion unit disposed between the first electrode and the second electrode; and
an adhesive layer disposed between the optical conversion unit and the second electrode,
wherein the optical conversion unit includes a partitioning part and an accommodation part alternately disposed,
wherein a dispersion liquid of which light transmittance changes is disposed inside the accommodation part,
wherein the dispersion liquid is disposed in direct contact with a bottom surface, an inner surface of the accommodation part, and a lower surface of the adhesive layer,
wherein a first contact angle between the dispersion liquid and the bottom surface and the inner surface of the accommodation part is 20° or less,
wherein a second contact angle between the dispersion liquid and the lower surface of the adhesive layer is 20° or less, and
wherein a difference between the first contact angle and the second contact angle is 1° to 10.

2. The optical path control member of claim 1, wherein the dispersion liquid has a hydrophobic property inside the accommodation part.

3. The optical path control member of claim 1, wherein the first contact angle is 5° to 20°, and
wherein the second contact angle is 3° to 15°.

4. The optical path control member of claim 1, wherein the dispersion liquid includes a solvent, optical conversion particles, and a dispersant,
wherein the solvent is included in an amount of 89.5 wt % to 94.7 wt % with respect to a total amount of the dispersion liquid,
wherein the optical conversion particles are included in an amount of 1 wt % to 3.5 wt % with respect to the total amount of the dispersion liquid, and
wherein the dispersant is included in an amount of 1 wt % to 1.8 wt % with respect to the total amount of the dispersion liquid.

5. The optical path control member of claim 4, wherein surfaces of the optical conversion particles are charged with a negative charge, and
wherein the optical conversion particles that move by applying a voltage at any one of the first electrode and the second electrode.

6. The optical path control member of claim 4, wherein permittivity of the solvent is 1 to 7.5.

7. The optical path control member of claim 1, wherein the first contact angle is greater than the second contact angle.

8. The optical path control member of claim 1, wherein the first contact angle is defined as an angle between a surface of a droplet of the dispersion liquid and the bottom and inner surfaces of the accommodation part when the dispersion liquid is dropped on the bottom and inner surfaces of the accommodation part, and
wherein the second contact angle is defined as an angle between a surface of a droplet of the dispersion liquid and the lower surface of the adhesive layer when the dispersion liquid is dropped on the lower surface of the adhesive layer.

9. The optical path control member of claim 1, wherein the first contact angle is 8° to 15°, and
wherein the second contact angle is 5° to 10°.

10. The optical path control member of claim 1, wherein the difference between the first contact angle and the second contact angle is 3° to 5°.

11. A display device comprising:
a display panel; and
the optical path control member according to claim 1 disposed on the display panel.

12. The display device of claim 11, wherein the dispersion liquid has a hydrophobic property inside the accommodation part.

13. The display device of claim 11, wherein the first contact angle is 5° to 20°, and
wherein the second contact angle is 3° to 15°.

14. The display device of claim 11, wherein the dispersion liquid includes a solvent, optical conversion particles, and a dispersant,
wherein the solvent is included in an amount of 89.5 wt % to 94.7 wt % with respect to a total amount of the dispersion liquid,
wherein the optical conversion particles are included in an amount of 1 wt % to 3.5 wt % with respect to the total amount of the dispersion liquid, and
wherein the dispersant is included in an amount of 1 wt % to 1.8 wt % with respect to the total amount of the dispersion liquid.

15. The display device of claim 11, wherein the permittivity of the solvent is 1 to 7.5.

* * * * *